United States Patent [19]
Weiss et al.

[11] Patent Number: 5,941,356
[45] Date of Patent: Aug. 24, 1999

[54] PRESSURE PLATE ASSEMBLY FOR A MOTOR VEHICLE FRICTION CLUTCH HAVING A WEAR SENSOR AND A DEVICE FOR PROTECTING THE WEAR SENSOR DURING SHIPMENT AND A METHOD FOR SHIPPING THE PRESSURE PLATE ASSEMBLY

[75] Inventors: Michael Weiss, Dittelbrunn; Reinhold Weidinger, Unterspiesheim; Achim Link; Andreas Orlamünder, both of Schweinfurt; Uwe Sahlmüller, Geldersheim, all of Germany

[73] Assignee: Fichtel & Sachs AG, Schweinfurt, Germany

[21] Appl. No.: 08/844,459

[22] Filed: Apr. 18, 1997

[30] Foreign Application Priority Data

Apr. 18, 1996 [DE] Germany .............................. 196 15 255
Sep. 23, 1996 [DE] Germany .............................. 196 38 918

[51] Int. Cl.[6] ...................................................... F16D 13/70
[52] U.S. Cl. .................................. 192/70.25; 192/111 A; 192/109 R
[58] Field of Search ............................ 192/70.25, 111 A, 192/109 R

[56] References Cited

U.S. PATENT DOCUMENTS 5,568,852 10/1996 Tomiyama .
5,634,541 6/1997 Maucher .............................. 192/70.25
5,690,203 11/1997 Link et al. ............................ 192/70.25

FOREIGN PATENT DOCUMENTS 2553483 4/1985 France .
2264989 9/1993 United Kingdom .
2298251 8/1996 United Kingdom .

Primary Examiner—Charles A. Marmor
Assistant Examiner—Saúl J. Rodríguez
Attorney, Agent, or Firm—Nils H. Ljungman & Associates

[57] ABSTRACT

A pressure plate subassembly for a motor vehicle friction clutch, which subassembly comprises an application plate or pressure plate which, when assembled in a motor vehicle friction clutch, is connected to a flywheel to rotate jointly around an axis and can be axially displaced with respect to the flywheel. The pressure plate has a friction surface which faces the flywheel, and at least one clearance sensor is provided on the pressure plate. The clearance sensor has an operation lever segment that cooperates with a wear adjustment device, and an axial stop segment which cooperates with the flywheel. The pressure plate subassembly comprises the displacement contrivances, which displacement contrivances prevent a displacement of the clearance sensor, of which there is at least one, with respect to the pressure plate prior to the assembly of the pressure plate subassembly to the flywheel. The clearance sensor, of which there is at least one, can be displaced in the axial direction with respect to the pressure plate and is held on the pressure plate in the axial direction by spring pre-stressing.

2 Claims, 19 Drawing Sheets

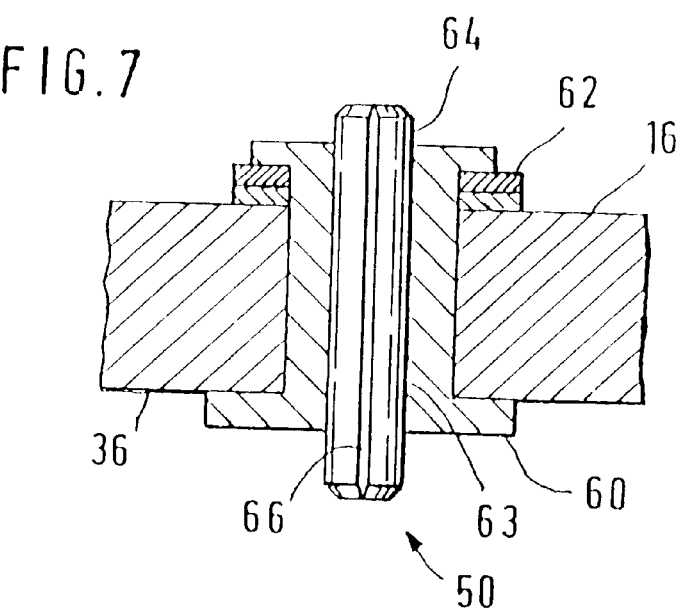
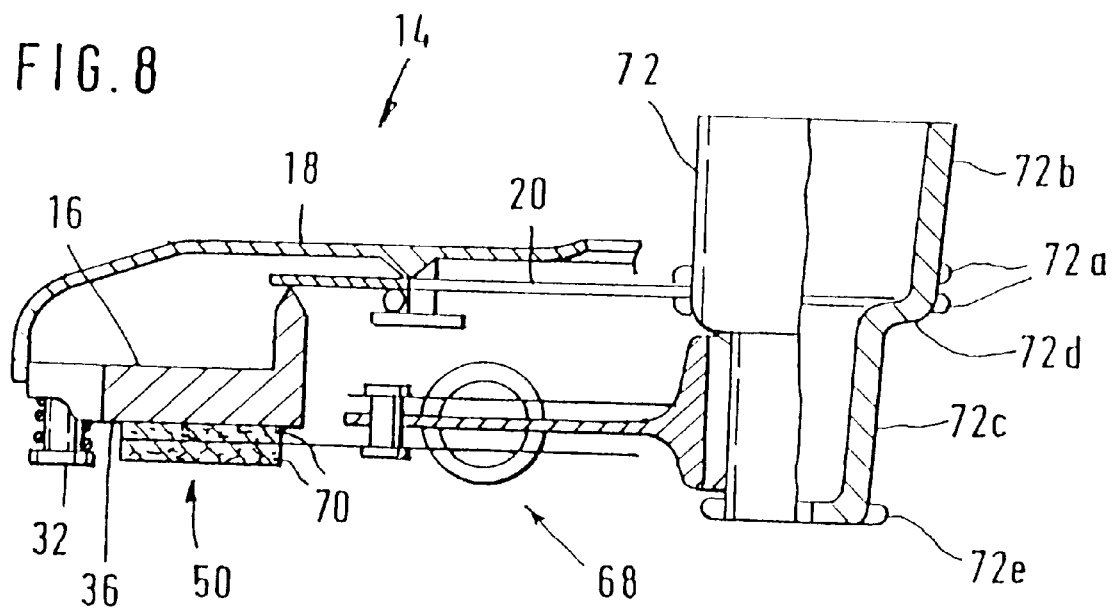

PRESSURE PLATE ASSEMBLY FOR A MOTOR VEHICLE FRICTION CLUTCH HAVING A WEAR SENSOR AND A DEVICE FOR PROTECTING THE WEAR SENSOR DURING SHIPMENT AND A METHOD FOR SHIPPING THE PRESSURE PLATE ASSEMBLY

BACKGROUND OF THE INVENTION

1. Field of the Invention

The present invention relates to a pressure plate subassembly for a motor vehicle friction clutch which subassembly, when the motor vehicle friction clutch is in assembled condition, comprises a pressure plate which is connected to a flywheel to rotate jointly around an axis, and which pressure plate can be axially displaced with respect to the flywheel. The pressure plate has a friction surface which faces the flywheel, and has at least one clearance sensor provided at the pressure plate. The clearance sensor has an operation lever segment which cooperates with a play adjustment device and an axial stop segment which cooperates with the flywheel, whereby the clearance sensor, of which there is at least one, can be displaced in an axial direction with respect to the pressure plate and is held to the pressure plate in an axial direction, preferably by pretensioning.

2. Background Information:

In the production or assembly of motor vehicle friction clutches, the various components or subassemblies for the motor vehicle friction clutch are commonly produced or pre-assembled by different manufacturers and then assembled by the manufacturer of the motor vehicle, for example. It is especially common that the pressure plate subassembly and the flywheel for the motor vehicle friction clutch are produced by different manufacturers. Transporting such pressure plate subassemblies either from the manufacturer to the customer, or within the manufacturer's plant, incurs the risk of unintentionally applying a displacement force to the clearance sensors already arranged on the pressure plate of the pressure plate subassembly, so that its end segment, which cooperates with the flywheel, moves closer to the pressure plate, and especially to the friction surface of the pressure plate. This then leads to an adjustment process of the play adjustment device provided on the pressure plate. Prior to assembling the motor vehicle friction clutch, the clearance sensor must therefore be manually set back to its original position, whereby the play adjustment device which cooperates with the clearance sensor must be simultaneously reset into an initial position. In addition, there is a risk that the unintentional displacement of the clearance sensor may also go unnoticed, and the motor vehicle friction clutch can thus be assembled with an already displaced clearance sensor which cannot perform its intended function at the start of operation.

OBJECT OF THE INVENTION

The present invention is therefore based on the problem of designing a pressure plate subassembly in a manner that offsets the risk of an unintentional displacement of the clearance sensor arranged on the pressure plate during the transport of the pressure plate subassembly.

SUMMARY OF THE INVENTION

The invention solves this problem with a pressure plate subassembly for a motor vehicle friction clutch, comprising a pressure plate which, in assembled condition of the motor vehicle friction clutch, can be connected to a flywheel to rotate jointly with the same around an axis and can be axially displaced with respect to the flywheel. The pressure plate can have a friction surface that faces the flywheel, and at least one clearance sensor can be provided at the pressure plate. The at least one clearance sensor can have an operation lever segment which cooperates with a play adjustment device, and an axial stop segment which cooperates with the flywheel, whereby the clearance sensor, of which there is at least one, can be displaced in an axial direction with respect to the pressure plate and can be held at the pressure plate in an axial direction, preferably by pretensioning or a prestressed spring. The pressure plate subassembly can further comprise displacement contrivances or mechanisms which prevent a displacement of the clearance sensor, of which there is at least one, with respect to the pressure plate before the pressure plate subassembly and the flywheel are assembled.

Thus, the pressure plate subassembly can always be delivered for assembly with the flywheel in such a condition that an adjustment of the clearance sensor provided in the pressure plate is not required; rather, the clearance sensor is already in the required position before the motor vehicle friction clutch is assembled.

At the same time, the displacement contrivances can be such, for example, that a displacement force effect is prevented on the area of the axial stop segment which may, for example, project past the friction surface. Preferably, the displacement contrivances can then comprise shielding elements, which shielding elements may extend farther past the friction surface than the axial stop segment. Thus, when placing the pressure plate subassembly on a table, for example, the axial stop segment cannot cause a displacement of the clearance sensor by making contact with the table surface or such, for example.

The shielding elements can be arranged on the pressure plate, for example.

An especially favorable shielding of the axial stop segment is achieved if the shielding elements at least partially surround the axial stop segment in the direction of the periphery. In this way, the shielding elements can comprise a shielding sleeve.

For a simple fastening or attaching or fixing of the shielding sleeve on the pressure plate, it is suggested that the shielding sleeve can partially project into an opening which is provided on the pressure plate and is penetrated by the axial stop segment, and that the shielding sleeve be positioned with contact on the pressure plate in said opening.

If the shielding sleeve can be plastically or elastically deformed by applying a predetermined force, it may not be necessary to remove the shielding sleeve prior to the assembly of the motor vehicle friction clutch. Rather, the effect of the force which presses the pressure plate on the flywheel on the assembled motor vehicle friction clutch can deform the shielding sleeve in such a manner that the axial stop segment of the clearance sensor can make contact with the flywheel and thus perform its function.

It is also possible that the shielding elements comprise at least one shielding shoe, which shielding shoe can preferably be positioned at the pressure plate through a plug-in effect and can at least partially surround the axial stop segment when positioned at the pressure plate. During assembly of the motor vehicle friction clutch, the shielding shoe can be removed by simply unplugging it from the pressure plate. It is then ensured that the assembled motor vehicle friction clutch has no components which are unnecessary for the clutch function.

In this way, the shielding shoe, of which there is at least one, can be made of a self-disintegrating material, preferably wax or a material which disintegrates in humidity. It can then be unnecessary to remove the shielding shoe during the assembly of the motor vehicle friction clutch; rather, it can melt and flow out on its own when the clutch is operated and a relatively high amount of heat is generated. During the assembly of the motor vehicle friction clutch, the fusible material can especially ensure that the axial stop segment of the clearance sensor can be positioned on the flywheel because said melting material can deform the shielding shoe.

In this way, it is advantageous if the fusible material melts at operating temperatures, preferably at approximately 30° Celsius and higher.

In another embodiment, it is possible that the shielding elements comprise at least one pin element which is held by a friction press-fit on the pressure plate subassembly and can be axially displaced when a predetermined force is applied. In this embodiment, it is also unnecessary to remove the pin element prior to assembling the motor vehicle friction clutch. Rather, the force that acts between pressure plate subassembly and flywheel during the assembly again moves the pin element into a position where it does not interfere with the operation of the clearance sensor.

By positioning the pin element, of which there is at least one, on the pressure plate in the vicinity of the axial stop segment, it is ensured that it acts precisely in the sensitive area of the pressure plate subassembly, namely in the area of the clearance sensor.

A particularly simple and cost-effective embodiment can provide that at least one pin element be positioned on the pressure plate in a plate spring rivet.

The pressure plate subassembly can also comprise a housing which is non-rotationally connected to the pressure plate and can be axially displaced with respect to the pressure plate, which housing is solidly connected to the flywheel in an outer radial area when the motor vehicle friction clutch is in the assembled condition. In doing so, shielding elements, for example at least one pin, may be provided on the housing.

The housing preferably can comprise a radial periphery flange to position the housing on the flywheel. To provide shielding elements, the radial periphery flange can be deformed in an axial direction. For example, at least one axial convexity such as a bulge, swell, flare or protuberance, can be provided in the radial periphery flange. Alternatively, it is easily possible to provide at least one shielding tongue in the radial periphery flange, said shielding tongue can extend in the direction of the periphery and can be connected to the periphery flange in one end area, while its second end area projects in an axial direction.

It is also possible that at least one projection can be provided in a radial outer segment of the housing; said projection can extend in the axial direction and can form the shielding elements. In such an embodiment of shielding elements, the additional elements usually required for the components of the pressure plate subassembly are obsolete or unnecessary. Rather, the components of the pressure plate subassembly that are already present, especially the housing in the area of its radial outer housing, form the shielding elements. In this case, a flywheel may also be provided that has at least one recess to accommodate the shielding elements.

Alternatively, it is also possible that the shielding elements can extend radially past the flywheel on the outside.

According to another embodiment, a plurality of holes can be provided in the radially outer housing area, which plurality of holes can be penetrated by studs to affix the housing to the flywheel. The studs can then form the shielding elements, whereby the studs are essentially completely inserted into the holes and means are provided to maintain the studs in the completely inserted position. Here as well, it is thus possible to utilize the elements required to connect the pressure plate subassembly to the flywheel as shielding elements.

The pressure plate subassembly may also comprise an energy storing device, especially a membrane spring, whereby the energy storing device can push the pressure plate in the direction of an open side of the housing which is provided to connect the housing to the flywheel. Means of pre-stressing can also be provided to hold the pressure plate against the force effect of the energy storing device in a position which is completely retracted into the housing. This completely retracted position of the pressure plate essentially conforms to a possible disengagement position of the clutch after the motor vehicle friction clutch has been assembled. In this position, all components connected to the pressure plate, i.e., even the clearance sensor, are completely retracted into the housing, so that a force effect on the clearance sensor, for example if the clearance sensor is placed on a level surface, can be avoided.

The pressure plate subassembly can also comprise a clutch disc which may be positioned on the friction lining of the pressure plate with the possible interposition of friction linings. In this manner, removable means of fastening, attaching or fixing can also be provided to attach or fasten the clutch disc with respect to the pressure plate, whereby the clutch disc and possibly the friction linings cooperate with the means of fastening to form the shielding elements. The means of fastening can also hold the clutch disc to the pressure plate. The means of fastening can also be removed before assembling the pressure plate subassembly and the flywheel. Because the thickness of the clutch disc, possibly including the friction linings, in a new motor vehicle friction clutch of this type is as least the same as the area of the axial stop segment which extends across the friction surface of the pressure plate, the clutch disc, possibly including the friction linings, can protect the axial stop segment against unintentional force effects.

According to another embodiment of the pressure plate subassembly according to the invention, the shielding elements can comprise a shielding plate arranged on the housing; wherein the shielding plate is in a shielding position when the housing is separated from the flywheel. In this shielding position, the shielding plate can project above a flywheel bearing surface of the housing in the axial direction to protect the axial stop segment of the clearance sensor, of which there is at least one. When the housing is connected to the flywheel, the shielding plate can be moved by an essentially axially directed force into a function release position, where the axial stop segment can detect any wear.

An especially effective and secure shielding of the clearance sensor, of which there is at least one, can be achieved if the shielding plate comprises an essentially rigid plate which is affixed to the housing preferably in the direction of the periphery on both sides of the clearance sensor, of which there is at least one, and can be axially displaced.

To provide for a sufficiently reliable shielding effect on the one hand, and to be able to ensure that the shielding plate is moved from the shielding position to the function release position during the assembly of the pressure plate subassembly and the flywheel on the other hand, it is proposed that at least one essentially axially extending pin element, for example a peg, can be arranged on the plate in each area of its periphery ends, which pin element is held by friction press-fit in a corresponding pin reception opening on the housing and can be axially displaced. The pin element is particularly easy to produce and can nevertheless be highly effective if it comprises a grooved pin or similar structure.

If an indentation, which is recessed with respect to the flywheel bearing surface, is arranged on the housing segment which is provided to affix the shielding plate for the clearance sensor, of which there is at least one, such an indentation can essentially completely accommodate the shielding plate when the housing and the flywheel are connected and it is ensured that the shielding plate, which in this embodiment remains on the pressure plate subassembly after the connection of the pressure plate subassembly and the flywheel, will not interfere with other components in the subsequent operation of a clutch constructed in this manner. Furthermore, an increase in the axial construction height of a clutch constructed in such a manner can be avoided.

It can be provided that the side of the shielding plate which faces the flywheel rests at least partially on the flywheel when the housing is connected to the flywheel. To detect the wear, the axial stop segment can then be positioned on the side of the shielding plate which faces away from the flywheel. This means that in an embodiment of this type, the axial stop segment of the at least one clearance sensor, which axial stop segment tentatively moves in the direction of the flywheel in case of wear, will not directly scan the surface of the flywheel, but rather a surface of the shielding plate. However, because the shielding plate has a defined thickness and is positioned to make contact with, or rests tightly on, the flywheel, a reliable detection of wear is also possible in this manner.

Alternatively, it may be provided that the shielding plate has an axial through-opening which essentially can extend with the axial stop segment in the axial direction, and that the axial stop segment can be brought to bear on the flywheel to detect wear.

According to another embodiment, the shielding plate can comprise a preferably spring-elastically deformable spring plate element which is positioned on the housing in the direction of the periphery, preferably on both sides with respect to the at least one clearance sensor, and can be deformed from the shielding position into the function release position when the housing is connected to the flywheel. Because the shielding plate element, i.e., the deformable spring plate element, in this embodiment also remains on the clutch constructed in such a manner after the pressure plate subassembly has been connected to the flywheel, it is advantageous if an indentation which is recessed with respect to the flywheel bearing surface is arranged on the housing segment provided for the positioning of the spring plate element for the at least one clearance sensor, which indentation can essentially completely accommodate the spring plate element when the housing and the flywheel are connected. This again can prevent any interference between the spring plate element and other components after the housing and the flywheel have been connected, and additionally can assure that the axial construction height of a clutch constructed in this manner is not increased.

The spring plate element can be configured in such a manner that it essentially arches or curves around the axial stop segment when in the shielding position, and preferably essentially assumes the configuration of an M-spring, or a plate spring bent in an arc in opposite direction, after deformation into the function release position.

In order to be able to detect the wear of the axial stop segment with respect to the flywheel after the spring plate element has deformed into the function release position, it is proposed that the spring plate element has an axial through-opening which essentially extends in axial direction with the axial stop segment, and that the axial stop segment can be positioned on the flywheel to detect the wear.

When in the shielding position, the part of the shielding plate element which shields the axial stop segment can preferably be arranged parallel next to the flywheel bearing surface.

To assure that both the shielding plate element can be moved from its shielding position into the direction of the function release position when the pressure plate subassembly according to the invention is unintentionally placed on the shielding plate, and that such a displacement can nevertheless be compulsory if the housing is connected to the flywheel, it is proposed that the axial force be in a range of about 100 N to about 500 N, preferably, about 200 N to about 400 N.

According to another embodiment of the present invention, it may be provided that the displacement contrivances comprise blocking elements which can block a displacement of the clearance sensor in case an external displacement force effect is applied. This embodiment of the displacement contrivances thus does not primarily prevent any force from acting on the clearance sensor, but rather blocks the clearance sensor in its predetermined or preset position on the pressure plate.

These blocking elements, for example, can comprise a blocking shoe which can be inserted between the pressure plate on the side of the friction surface and a projection formed at the one free end of the axial stop segment. The blocking shoe can be removed prior to assembly of the motor vehicle friction clutch so that the clearance sensor can perform its function.

The blocking elements can also comprise a self-disintegrating ring element which is arranged on the pressure plate in the area of a through-opening that is penetrated by the axial stop segment, whereby the self-disintegrating ring element blocks the axial stop segment against axial movement by friction and/or sticking effect and/or by positive locking.

In this way, it is advantageous if the ring element melts at operating temperatures of preferably 30° Celsius or above. Thus, if the assembled motor vehicle friction clutch is operated, the heat created during operation will melt the ring element and release the clearance sensor to perform its function.

The pressure plate subassembly can again comprise a housing which is non-rotationally connected to the pressure plate and can be axially displaced with respect to the pressure plate. The blocking elements can comprise a blocking pin which is held at the housing and axially attaches the clearance sensor with respect to the housing. In this way, it is advantageously provided that the blocking pin can be attached in the housing by clamping effect, and can be moved to release the clearance sensor by applying a predetermined force in an axial direction with respect to the housing. In the assembly of the motor vehicle friction clutch, the blocking pin can then be moved by the very high force which acts between pressure plate and flywheel and the displacement of the clearance sensor with respect to the pressure plate in such a manner that the clearance sensor can fulfill its function.

It is furthermore possible that the pressure plate subassembly comprises an energy storing device, especially a membrane spring element, which energy storage device can pre-stress the pressure plate with respect to the housing, whereby the energy storing device has at least one projecting blocking projection which extends radially outward and acts on the clearance sensor to secure it against axial movement when the motor vehicle friction clutch is in unassembled condition. When assembling the motor vehicle friction clutch, the energy storing device can then be moved into a position which corresponds to the recessed or pressed-in condition of the clutch, where a clutch disc can be clamped between the pressure plate and the flywheel. Due to the deformation or curving or bowing of the energy storing device, the blocking projection can already be lifted off from the clearance sensor in this position, and the clearance sensor can be released.

Preferably, the blocking projection can engage on the clearance sensor in the area where the operation lever segment and the axial stop segment connect.

The blocking projection can be positioned on the energy storing device, preferably plugged in, and it can either be removed after the motor vehicle friction clutch has been assembled, or can remain in the energy storing device.

The present invention also relates to displacement contrivances for a pressure plate subassembly to prevent the displacement of a clearance sensor arranged in a pressure plate a4 prior to the assembly of the pressure plate subassembly and the flywheel, whereby the displacement contrivances comprise means to prevent a displacement force effect from acting on the clearance sensor, and/or means to block the clearance sensor from displacement when the displacement force effect acts on the clearance sensor.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE PREFERRED EMBODIMENT

The present invention is described in detail in the following, with references to the included illustrations:

FIG. 7 shows a further alternative embodiment of the displacement contrivances, which are designed as displaceable pins;

FIG. 8 shows a further alternative embodiment of the displacement contrivances, whereby the displacement contrivances are formed by the clutch disk which is connected to the pressure plate subassembly;

FIG. 14 is a view of FIG. 13 in the direction of an arrow XIV;

FIG. 18 shows a view of FIG. 17 in the direction of an arrow XVIII—XVIII;

Figure 19:
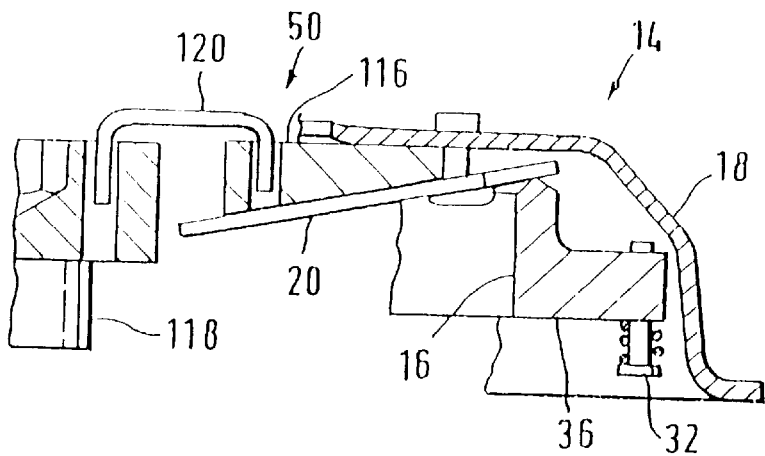
FIG. 19 shows a further alternative embodiment of the displacement contrivances, which positions the pressure plate in a position that is retracted into the housing.
Figure 20:
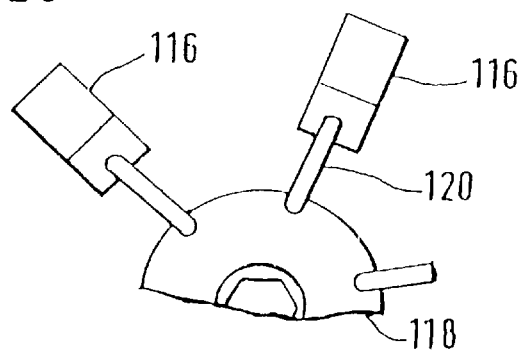
Figure 21:
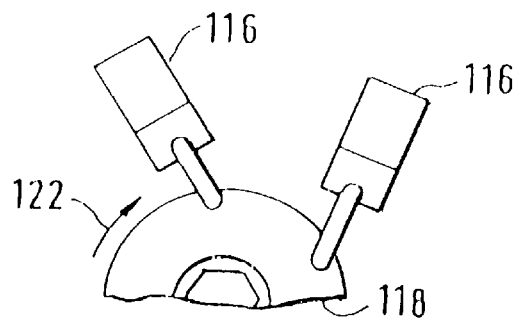
Figure 22:
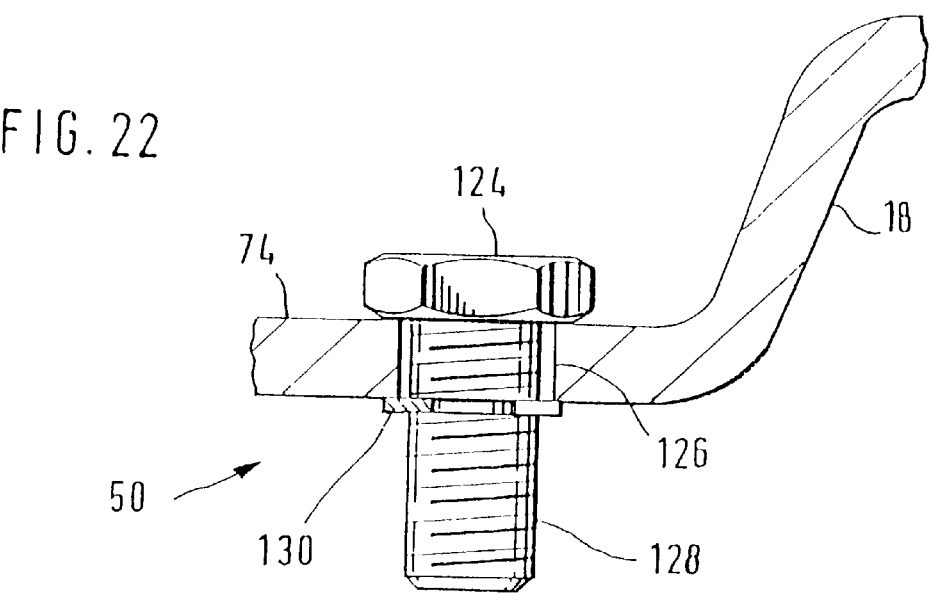
Figure 23:
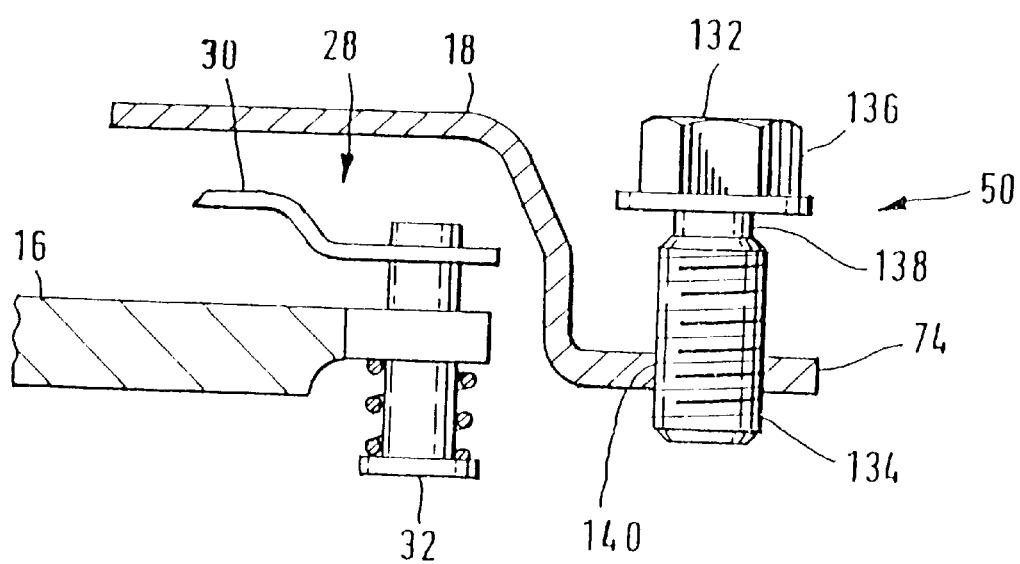
Figure 24:
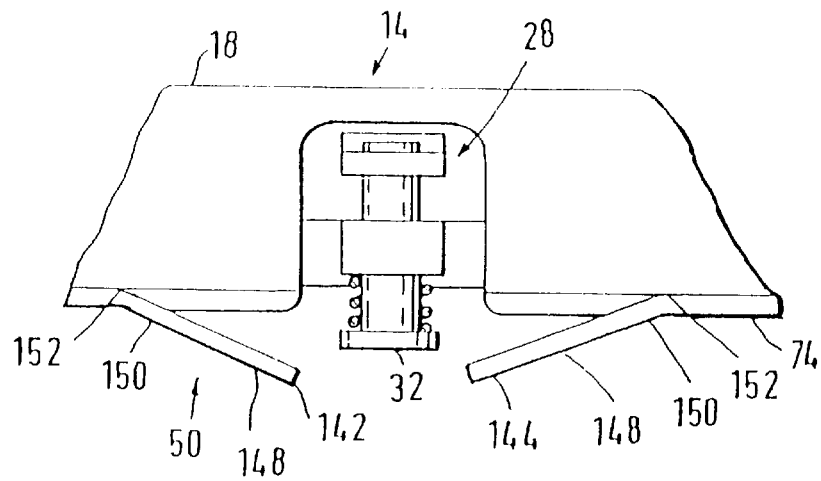
Figure 25:
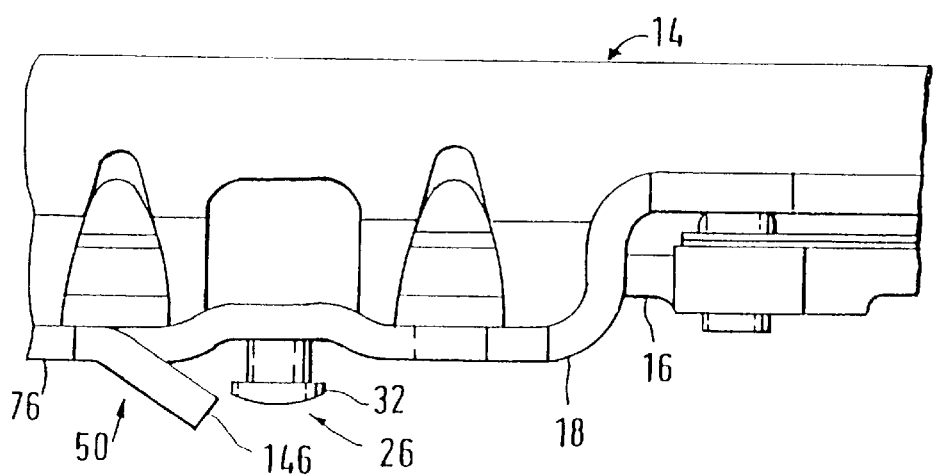
Figure 26:
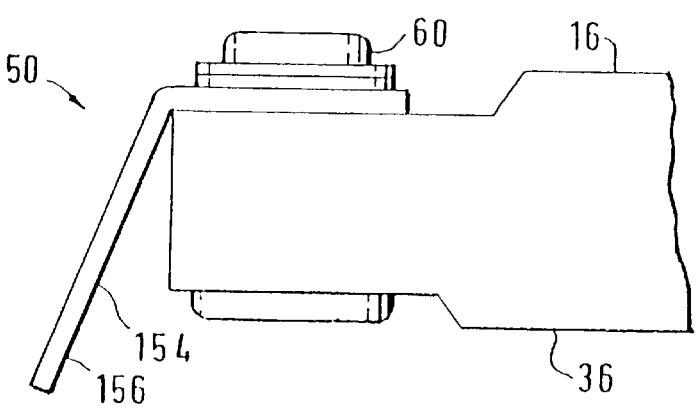
Figure 27:
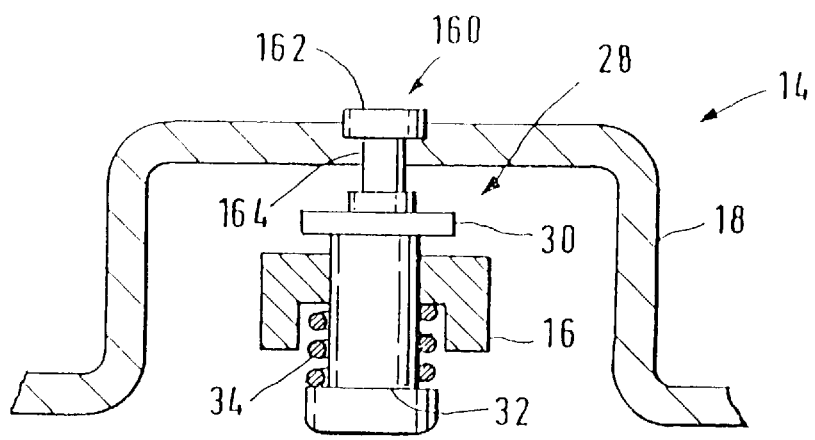
Figure 28:
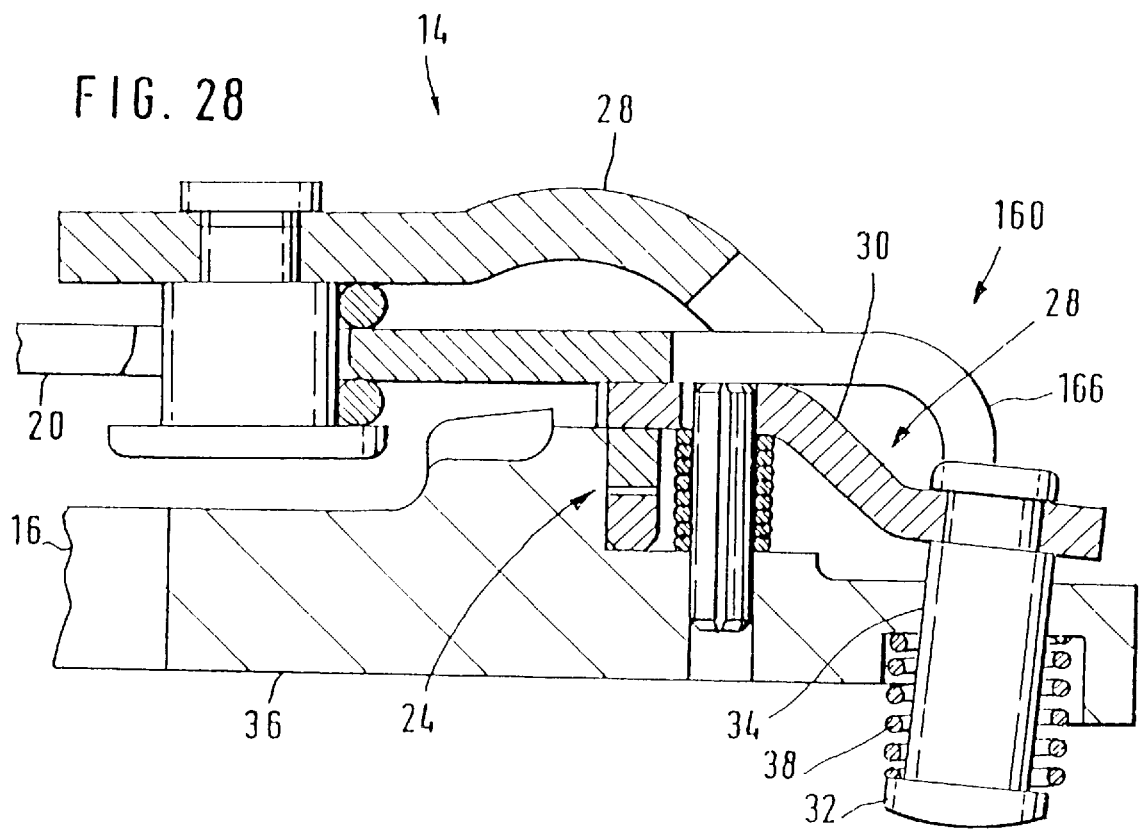
Figure 28:
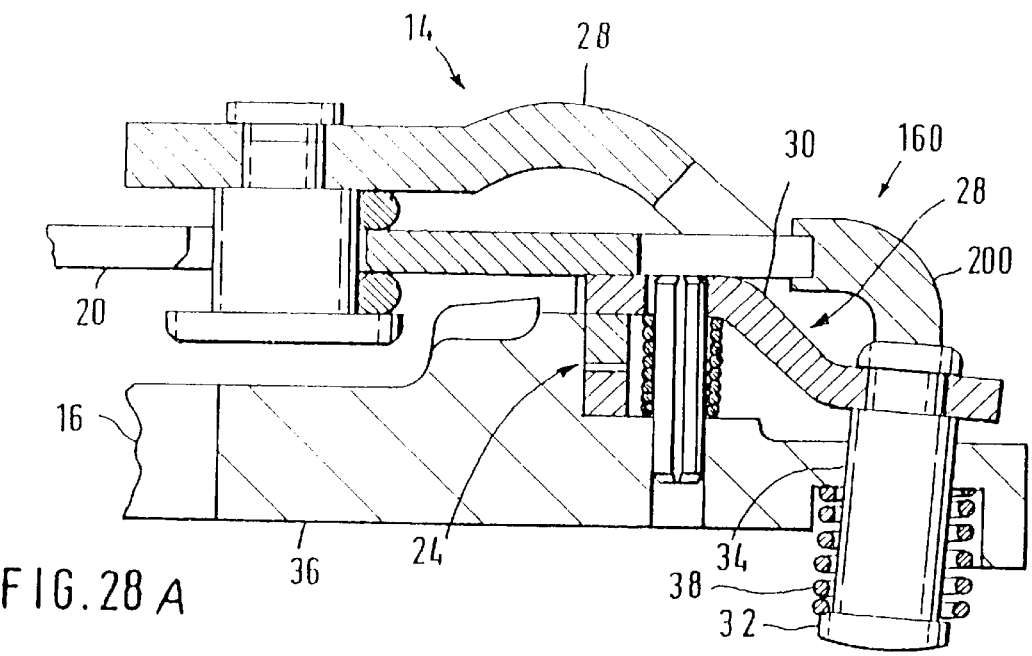
Figure 29:
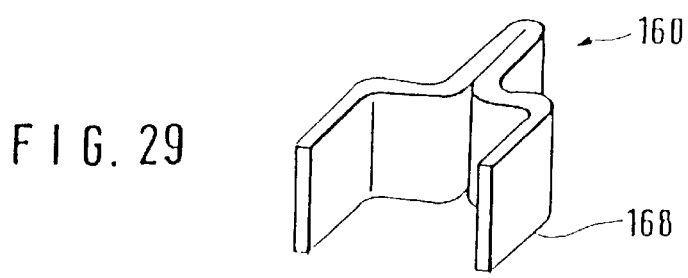
Figure 30:
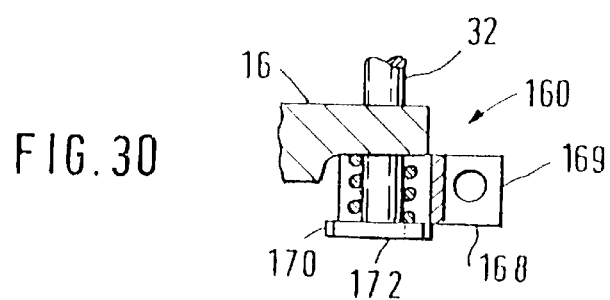
Figure 31:
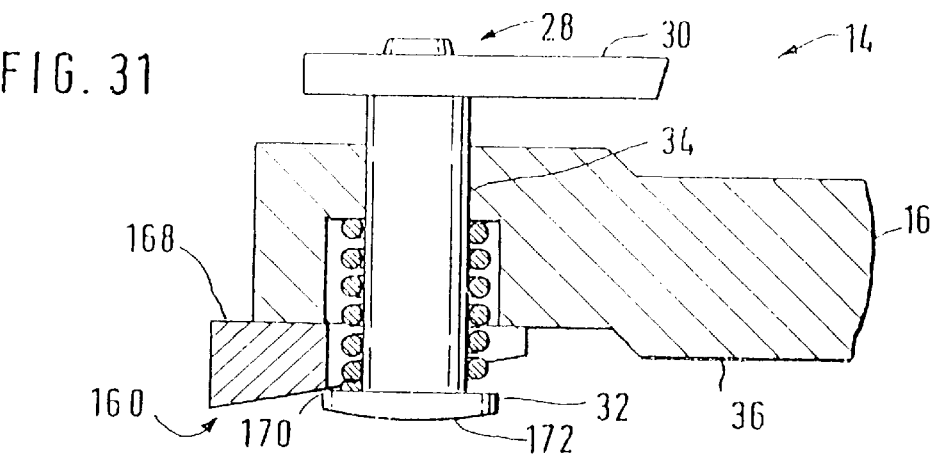
Figure 34:
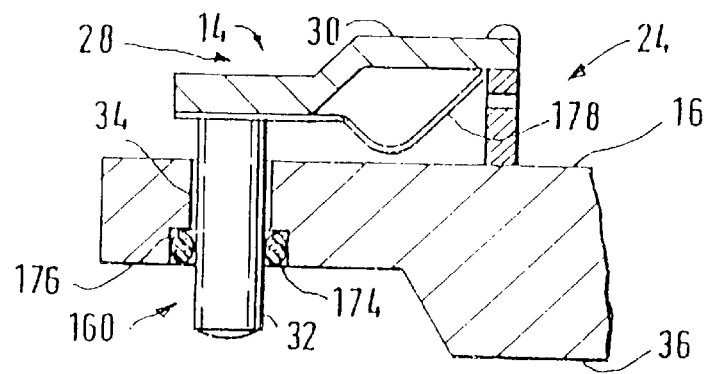
Figure 35:
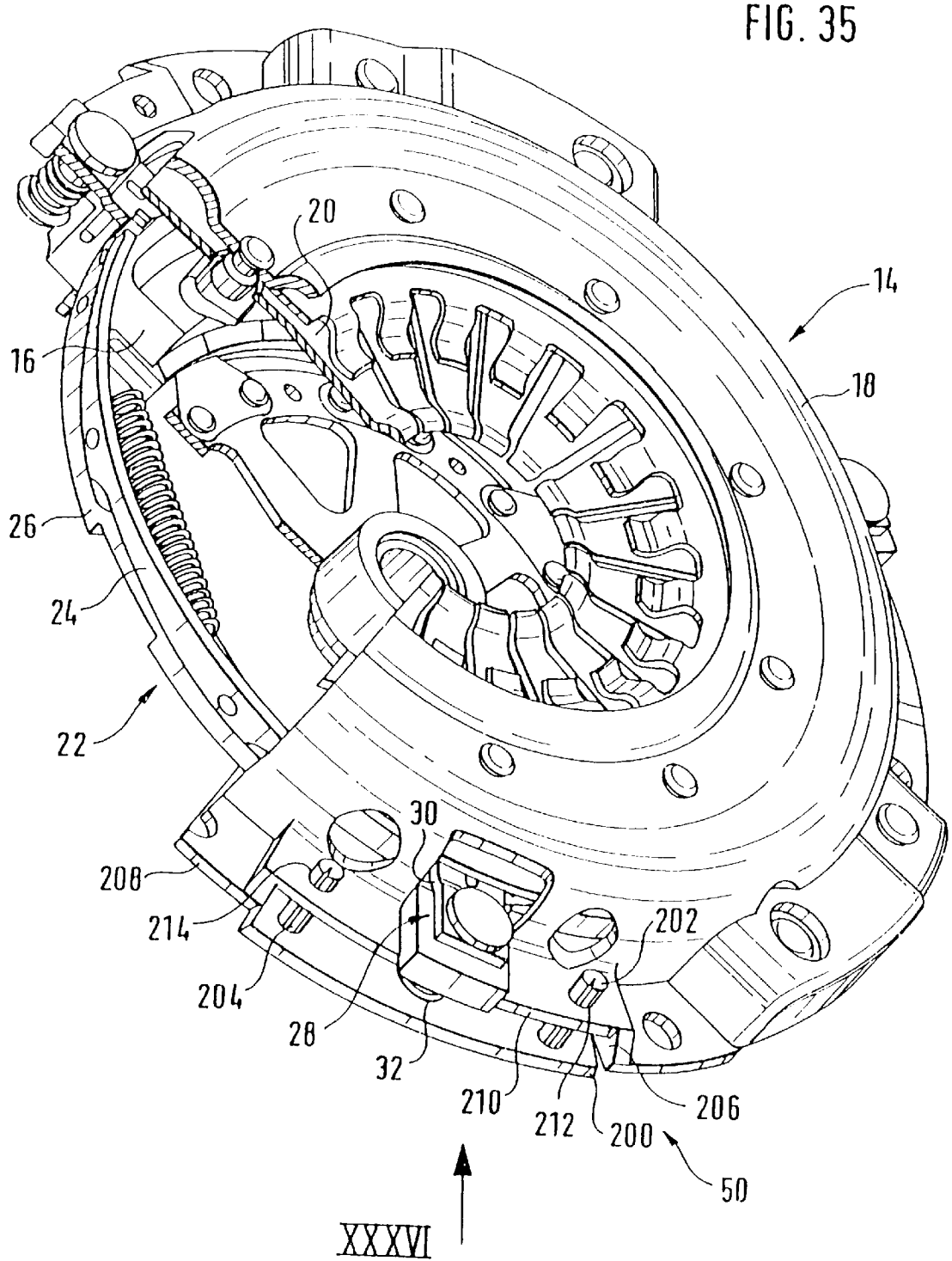
Figure 36:
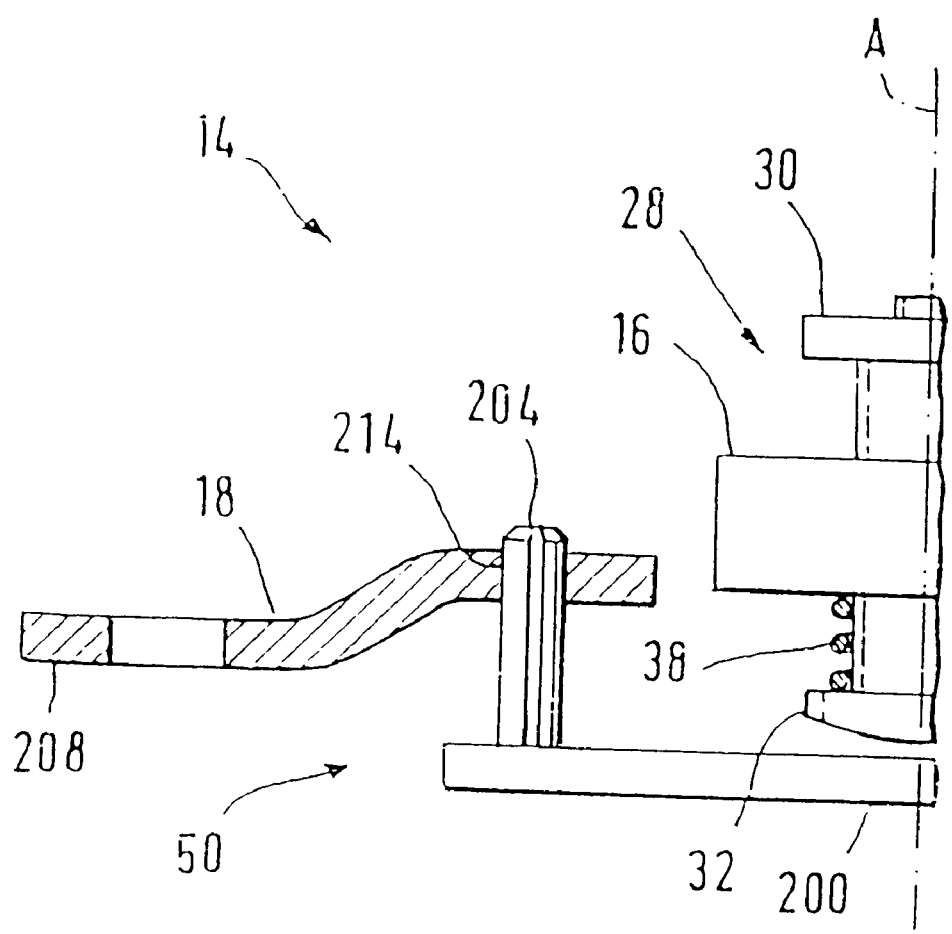
Figure 36:
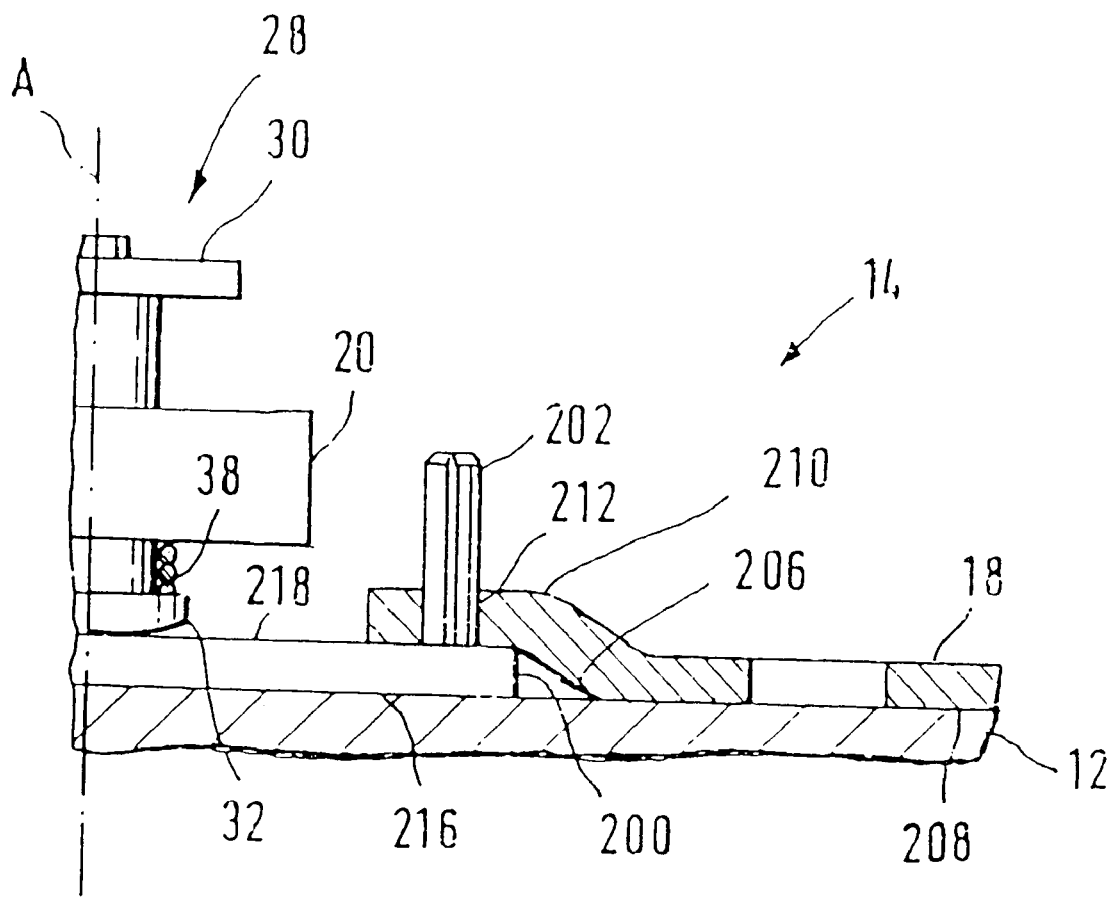
Figure 37:
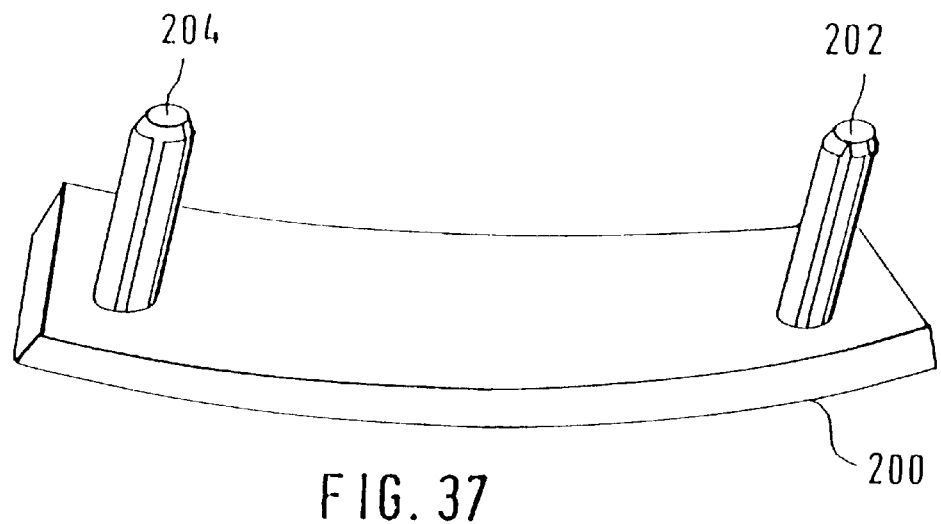
Figure 38:
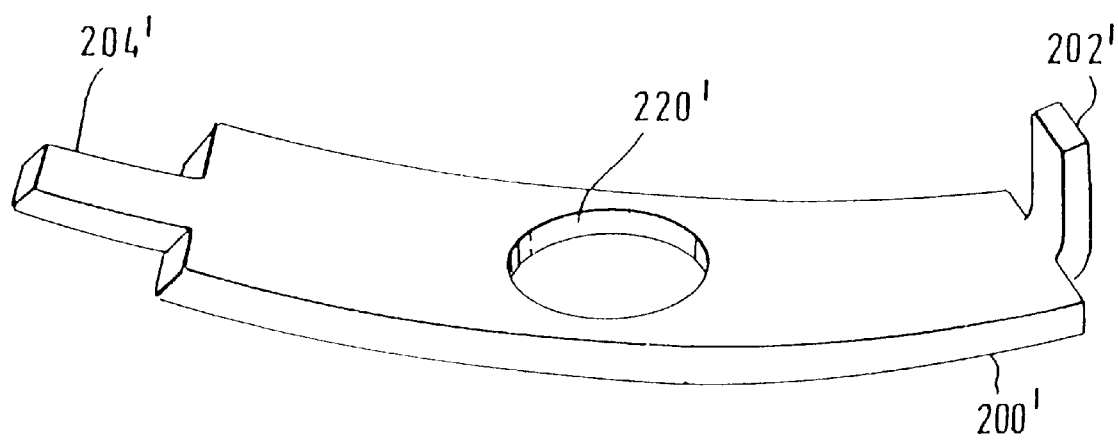
Figure 39:
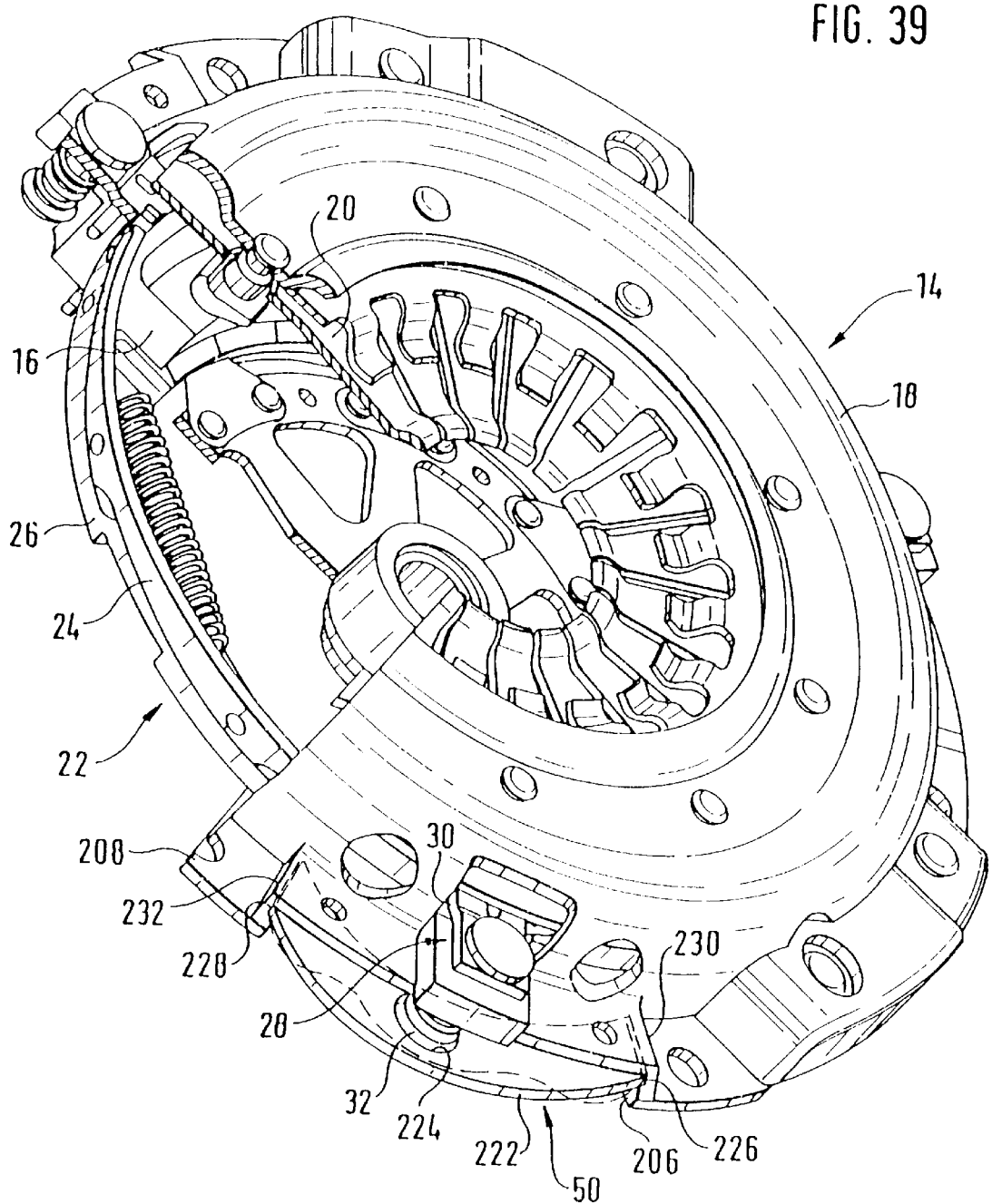

FIGS. 20 and 21 each show top views of the displacement contrivances of FIG. 19;

FIGS. 22 and 23 each further show alternative embodiments of displacement contrivances which are formed by fastening screws arranged at the radial periphery flange of the housing;

FIGS. 24 and 25 show further alternative embodiments of the displacement contrivances which are formed by tongue-type projections of the radial periphery flange;

FIG. 26 shows a further alternative embodiment of the displacement contrivances which are formed by a spring tongue positioned to make contact with the pressure plate;

FIG. 27 shows a further alternative embodiment of the displacement contrivances, where a bolt affixed to the housing secures the clearance sensor against displacement;

FIG. 28 shows a further alternative embodiment of the displacement contrivances, where the membrane spring secures the clearance sensor against displacement;

FIG. 28A shows an alternative embodiment of the displacement contrivances of FIG. 28;

FIG. 29 to 33 show a further alternative embodiment of the displacement contrivances where a clamping shoe secures the clearance sensor against axial displacement;

FIG. 34 shows a further alternative embodiment of the displacement contrivances where an adhesive, or glue ring, secures the clearance sensor against axial displacement;

FIG. 35 shows a perspective view of a pressure plate subassembly according to the invention with displacement contrivances according to a further alternative embodiment;

FIGS. 36A and 36B show a simplified schematic lateral view of the pressure plate subassembly in FIG. 35 in viewing direction of an arrow XXXVI in FIG. 35;

FIGS. 37 and 38 each show the embodiment option of a solid shielding plate; and FIG. 39 shows a perspective view of a pressure plate subassembly which corresponds to FIG. 35, with a further alternative embodiment of the displacement contrivances according to the invention.

DESCRIPTION OF THE PREFERRED EMBODIMENT

Figure 1:
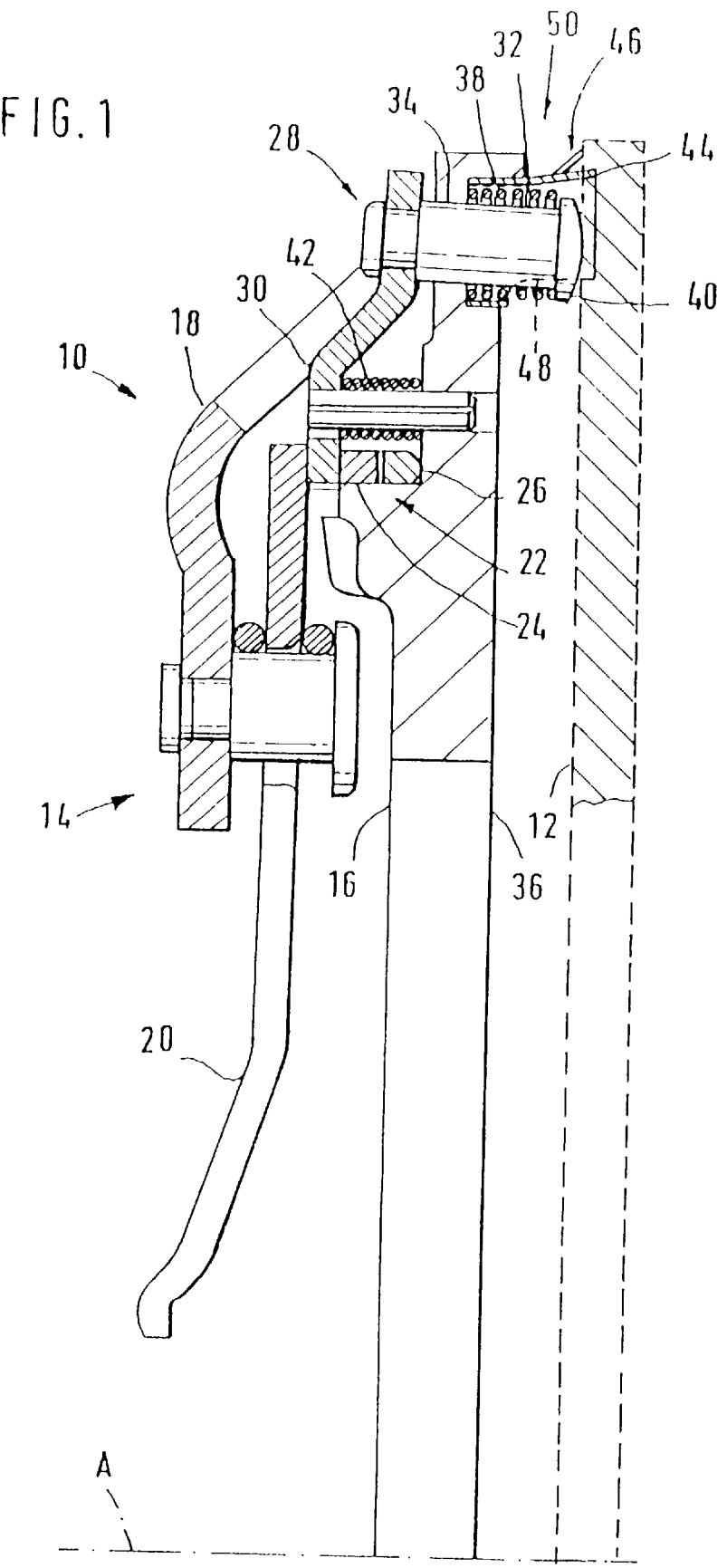
FIG. 1 shows a schematic longitudinal cross-section view through a motor vehicle friction clutch, whereby displacement contrivances for a clearance sensor are provided.

FIG. 1 shows a longitudinal view of a schematically represented motor vehicle friction clutch 10. FIG. 1 shows the essential elements of a pressure plate subassembly 14, which will be assembled with a flywheel 12 (illustrated by a dotted line). The pressure plate subassembly 14 comprises a pressure plate 16, a housing 18 which can be positioned on the flywheel 12 in an radial outer area in the known manner, as well as a membrane spring element 20, which is supported by the housing 18 and pre-stresses the pressure plate 16 in direction of the flywheel 12. In assembled condition of the motor vehicle friction clutch 10, a clutch disc (not shown) is held between the flywheel 12 and the pressure plate 16, possibly with the interposition of friction linings (not shown). The membrane spring 20 acts on the pressure plate 16 by means of a wear adjustment device 22. The wear adjustment device 22 may be constructed in several ways; in the embodiment of FIG. 1, it includes two ring elements 24, 26 which can be relatively displaced toward each other or can be displaced with respect to one another.

Furthermore, a clearance sensor 28 can be provided on the pressure plate 16. The clearance sensor 28 can comprise an operation lever segment 30 which cooperates or acts together with the wear adjustment device 22, and an axial stop segment 32 which penetrates a through-opening or boring 34 in the pressure plate 16, and extends past a friction surface 36 of the pressure plate 16. The diameter of the through-boring 34 is only slightly larger than the outer diameter of the axial stop segment 32, with the effect that a slight tilting of the clearance sensor 28 will lead to a friction press-fit of the clearance sensor 28 on the pressure plate 16.

In one embodiment, this moment of tilt is achieved by a coil pressure spring 38 which acts between the pressure plate 16 and a radially projecting periphery flange 40 on the axial stop segment 32, and also by a coil pressure spring 42, which acts on a radial inner area between the operation lever segment 30 and the pressure plate 16. The construction of such clearance sensors, as well as their interaction with wear adjustment devices of various embodiments, is largely known in the state of the art, and thus not described here in detail.

The diameter of the through-boring 34 in the pressure plate 16 is slightly enlarged in its open area on the side with the friction surface 36. In this-area of the through-boring 34, a sleeve element 44 is inserted in such a manner that it encloses the coil pressure spring 38 and is positioned to make contact at the pressure plate 16. The sleeve element 44 encloses the axial stop segment 32 of the clearance sensor 28 and projects farther from the friction surface 36 of pressure plate 16 than the axial stop segment 32. The sleeve 44 thus prevents a force which could displace the clearance sensor 28 from its original assembly position from acting on the clearance sensor 28, and especially the axial stop segment 32, when the pressure plate subassembly 14 is moved. This can be of particular importance when the pressure plate subassembly 14 and the flywheel 12 are supplied or pre-assembled by different manufacturers. If this is the case, there is a risk that during transport of the pressure plate subassembly 14, for instance when the pressure plate subassembly 14 is placed on a surface, a force will act on the axial stop segment 32 of the clearance sensor 28, displace the axial stop segment 32, and simultaneously effect a wear adjustment in the wear adjustment device 22, especially if the membrane spring 20 is mounted in such a manner that it does not yet rest on the wear adjustment device 22. In the subsequent assembly of the pressure plate subassembly 14 and the flywheel 12, it is therefore ensured that the clearance sensor 28 is still in its original assembly position and that no additional adjustment measures are required.

Figure 2:
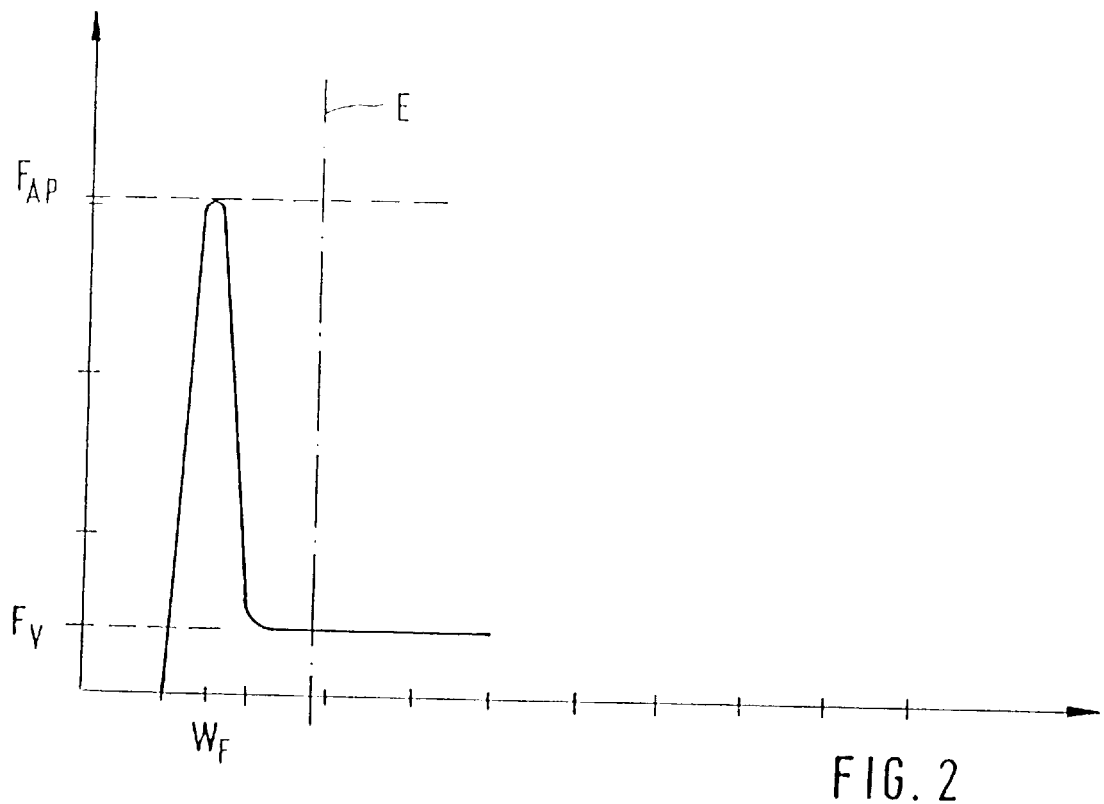
FIG. 2 shows a deformation force characteristic of the displacement contrivances represented in FIG. 1.

The sleeve 44 is dimensioned in such a manner, or made of such a material, that it will deform when a predetermined force is exceeded, as is shown in FIG. 1 at 46. A force diagram for such a sleeve 44 is shown in FIG. 2. The horizontal axis of the force diagram shows the deformation path, and the vertical axis shows the required deformation force. A vertical line E shows the deformation of the installation position, which in FIG. 1 conforms to the already deformed position (at 46) of sleeve 44. If the sleeve 44 is also deformed from its original condition, a strongly accelerating or increasing force is required up to a maximum $F_{AP}$. This maximum is at a deformation path $W_F$, where the sleeve 44 still extends farther beyond the friction surface 36 of pressure plate 16 than the axial stop segment 32. The deformation force then rapidly declines and drops to an essentially constant value $F_V$. The sleeve 44 is dimensioned in such a manner that the force $F_{AP}$ is greater by a multiple factor than the dead weight or own weight of the pressure plate assembly 14, but lower than the force of pressure applied by the membrane spring 20 when the motor vehicle friction clutch 10 is in assembled condition. This means that the sleeve 44 will be deformed during the assembly of the motor vehicle friction clutch 10, and will then essentially provide no resistance against movement of the pressure plate 16 on the flywheel 12 when the motor vehicle clutch 10 is in an assembled condition and during subsequent use.

To simplify such a deformation, an opening 48 may be provided in the sleeve 44. Alternatively, several such openings or slits 48 may be provided, which openings 48 are arranged around the periphery of the sleeve 44.

In this embodiment, the sleeve 44 forms the shielding elements 50 which protect the axial stop segment 32 of the clearance sensor 28 against unintentional exposure to force before the pressure plate subassembly 14 is assembled with the flywheel 12. Other alternative embodiments of such shielding elements 50 are represented in the figures described in the following. In these figures, the same or corresponding components are labeled with the same reference symbols as in FIG. 1. Reference numbers not appearing in the following Figures refer to the corresponding components depicted in FIG. 1.

Figure 3:
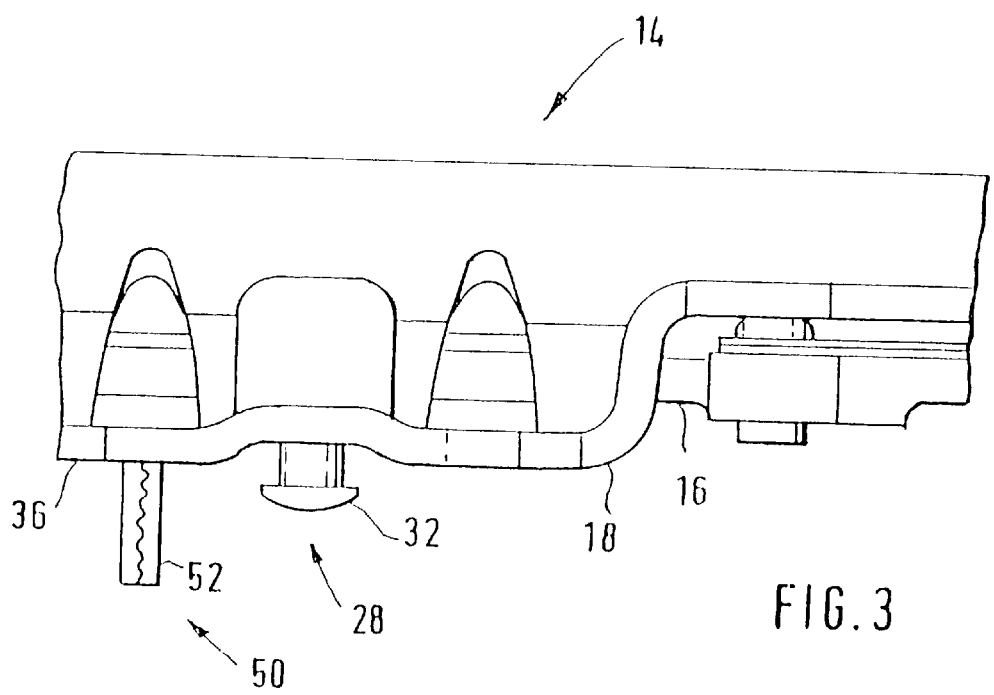
FIG. 3 shows an alternative embodiment of the displacement contrivances.

FIG. 3 shows a lateral view of a pressure plate subassembly 14 which again provides a clearance sensor 28 with an axial stop segment 32 at the pressure plate 16. Furthermore, a centering pin 52 is provided on the housing 18, which centering pin 52 forms the shielding elements 50 in this embodiment. In one embodiment, the centering pin 52 projects farther past the friction surface 36 of pressure plate 16 as does the axial stop segment 32 of clearance sensor 28, and thus prevents the axial stop segment 32 from making contact with a surface when the pressure plate subassembly 14 is placed on the floor, for example. The centering pin 52 also serves to affix the pressure plate subassembly 14 to the flywheel (not shown in FIG. 3) in a desired position. For this purpose, complementary openings are provided in the flywheel, and the centering pin 52 can be inserted into the openings in the flywheel. It is, also possible to provide several such centering pins 52 on the housing 1B and distribute them about the periphery. The construction of such centering pins 52 is known, so that a detailed description of the same can be omitted here.

Figure 4:
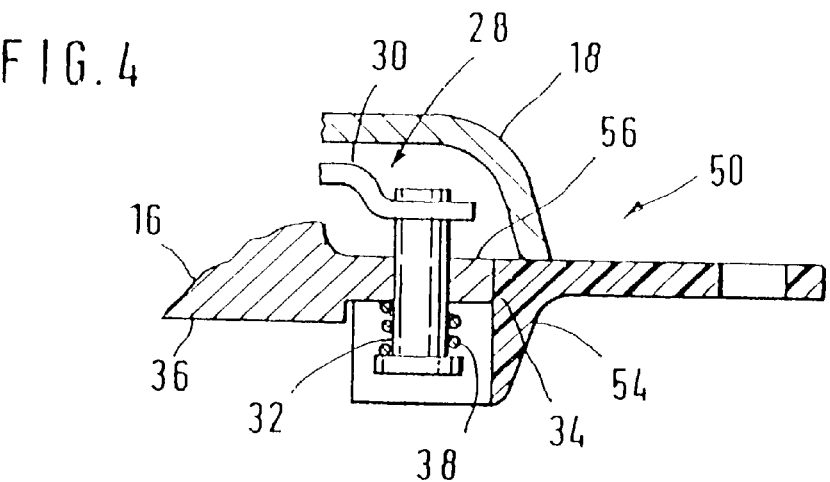
FIGS. 4 to 6 show further alternative embodiments of displacement contrivances which are designed as removable shielding shoes.
Figure 5:
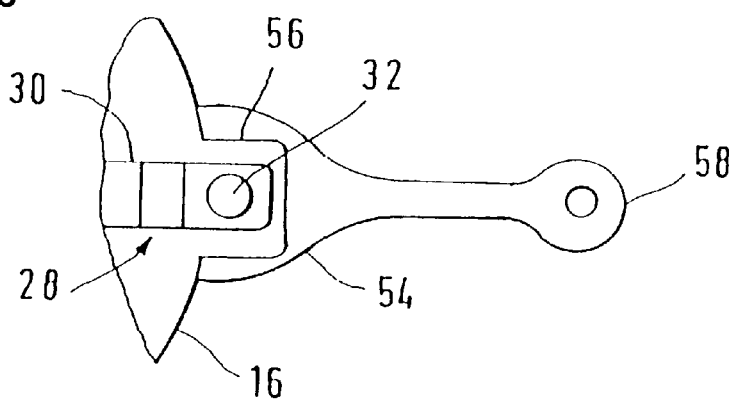
Figure 6:
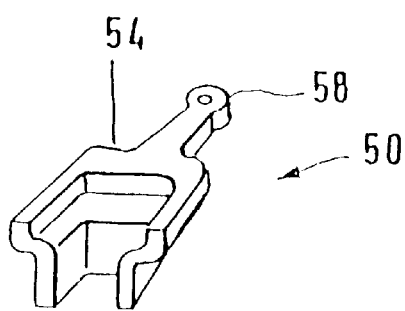

FIGS. 4 to 6 show another embodiment of the shielding elements 50 provided for the pressure plate subassembly 14. In this embodiment, the shielding elements 50 comprise a shielding shoe 54 which can be affixed to the pressure plate 16 by a plug-in mechanism. The shielding shoe 54 can be slid onto a radially protruding segment 56 of pressure plate 16 which forms the through-boring 34 for the axial stop segment 32 of the clearance sensor 28. The shielding shoe 54 again projects further past the friction surface 36 of the pressure plate 16 than the axial stop segment 32. The shielding shoe 54 can be removed prior to the assembly of the pressure plate subassembly 14 and the flywheel. For this purpose, a handle element 58 may be provided to make it easier to remove said shielding shoe. The shielding shoe 54 may, for example, be made of synthetic material.

FIG. 7 shows a further embodiment of the shielding elements 50 according to the invention. FIG. 7 represents a plate spring rivet 60 provided on the pressure plate 16. The plate spring rivet 60 holds a plate spring 62 at the pressure plate 16, which plate spring 62 is also positioned with contact on the housing 18 and thus provides a fastening for the pressure plate 16 on the housing 18 that is fixed in the turning direction, and displaceable in the axial direction. The plate spring rivet 60 also provides a through-opening 63 which extends in the axial direction. Inserted in said through-opening 63 is a pin, for example a grooved pin 64. Because of a groove 66 provided in the grooved pin 64, the dimensions of the circumference of grooved pin 64 are changeable so that it can be clamped in the plate spring rivet 62, but is axially displaceable when a predetermined force is applied. The grooved pin 64 again extends farther past the friction surface 36 of pressure plate 16 than the axial stop segment 32 of the clearance sensor 28.

When the pressure plate subassembly 14 is assembled to the flywheel 12, the force of pressure applied by the membrane spring 20 in particular moves the grooved pin 64 through contact with the flywheel 12 in such a manner that the grooved pin 64 does not interfere with the action of the clearance sensor 28. In this way, the clamping power of the grooved pin 64 in the plate spring rivet 60 is designed in such a manner that the force for the displacement of the grooved pin 64 is a multiple of the weight of the pressure plate subassembly 14, but smaller than the force of pressure applied by the membrane spring 20. Thus, the shielding elements 50 in this embodiment are provided by the grooved pin 64.

FIG. 8 shows another embodiment of the shielding elements 50. FIG. 8 furthermore provides a clutch disc 68 with friction linings 70. The clutch disc 68 is held at the membrane spring 20 by a fastening or affixing or attaching shoe 72. FIG. 8 shows a section of the right part of the fastening shoe 72. The fastening shoe 72 has two clamping build-ups or bulbs 72a on the face of its outer periphery on a first centering surface 72b for the pressure plate 16 or the membrane spring 20, into which the radial inner end segment of membrane spring 20 is clamped. The radial inner segment of clutch disc 68 rests on a second centering surface 72c and is clamped between a shoulder 72d, formed between the first centering surface 72b and the second centering surface 72c, and another clamping build-up or bulb 72e. The fastening shoe 72 thus already centers the clutch disc 68 with respect to the housing 18 and the pressure plate 16 prior to the assembly and is held in the proper position for assembly. If the diameters of the centering surfaces 72b, 72c are appropriately designed, the build-ups 72a, 72e may be omitted.

In this embodiment, the pressure plate 16, the housing 18, the membrane spring 20, and the clutch disc 68 as well as the fastening shoe 72 form the pressure plate subassembly 14. The fastening shoe 72 is removed after the assembly of the clutch 10. In the position of the fastening shoe 72 shown in FIG. 8, however, the fastening shoe 72 together with the clutch disc 68 form the shielding elements 50. In a new, unused condition of the motor vehicle friction clutch 10 or the pressure plate subassembly 14, the clutch disc 68 and its friction linings 70 project farther past the friction surface 36 of the pressure plate 16 than the axial stop segment 32. This again prevents the axial stop segment 32 from making contact with the floor and thus being unintentionally displaced, for example, if the pressure plate subassembly 14 is placed down on a floor. The construction of the clutch disc 68 is known and thus a detailed description has been omitted.

Figure 9:
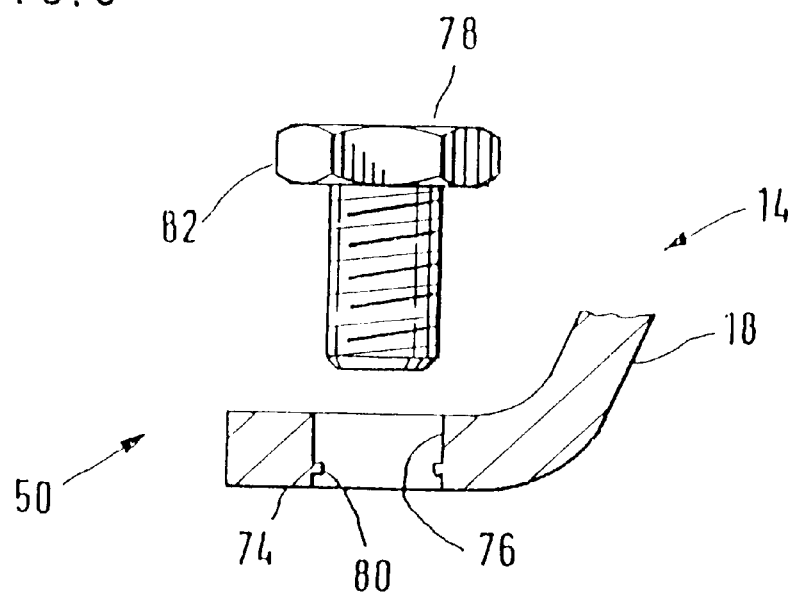
FIG. 9 shows a further alternative embodiment of the displacement contrivances, which are formed by fastening screws.

FIG. 9 shows another embodiment of the shielding elements 50. Here, the housing 18 has a radial periphery flange 74 which positions the housing 18 in the known manner on the flywheel 12. For this purpose, a screw 78 is inserted in an opening 76 provided in the radial periphery flange 74, which screw 78 is then screwed into a corresponding thread boring in the flywheel 12. FIG. 9 shows that only one screw thread or part of a screw thread 80 is provided in the boring 76. During assembly of the pressure plate subassembly 14, the screw 78 is screwed into the only screw thread 80 of the opening 76 until the screw head 82 makes contact with the radial periphery flange 74. In this manner, the thread 80 positions the screw 78 with contact on the housing 18. The length of the screw 78 is dimensioned in such a manner that it projects past the axial stop segment 32 when the pressure plate subassembly 14 is in assembled condition. During the assembly of the pressure plate subassembly 14 and the flywheel 12, a moment of torsion is applied to screw 78 to destroy the only thread 80, i.e., it is broken. The screw 78 can then be freely rotated in boring 76, and can be screwed into the corresponding screw thread in the flywheel 12 to affix the pressure plate 16 to the flywheel 12. Thus, no components are required for the design of the shielding elements 50 which would have to be removed from the pressure plate subassembly 14 or the assembled motor vehicle friction clutch 10 later on, and otherwise serve no other function.

Figure 10:
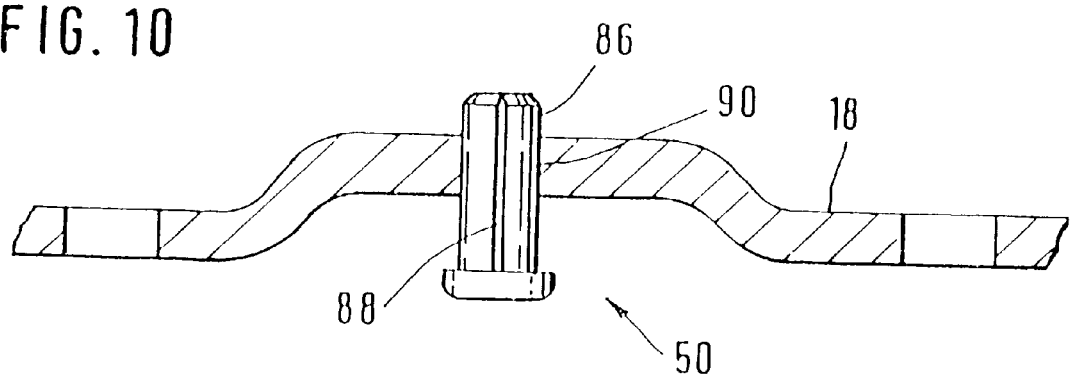
FIG. 10 shows a further alternative embodiment of the displacement contrivances, which comprise a pin that is movably connected to the housing of the pressure plate subassembly.

In FIG. 10, the shielding elements 50 again comprise a pin or parallel pin or stud, for example a grooved pin 86, with a groove 88, which is fitted into a boring 90 of housing 18. Because the circumference dimension of the grooved pin 86 is adjustable, the grooved pin 86 is again held in the boring 90 by clamping action. Again, the length of the grooved pin 86 is dimensioned such that it projects farther than the axial stop segment 32 of the clearance sensor 28 when the pressure plate subassembly 14 is in the assembled condition. The clamping force of the grooved pin 86 in the boring 90 is again dimensioned in such a manner that the clamping force is a multiple of the weight force of the pressure plate subassembly 14 prior to assembly with the flywheel 12. The clamping force can be overcome or compensated, however, by the force of pressure applied by the membrane spring 20, so that the grooved pin 86 can be displaced in the direction of the housing 18.

Figure 11:
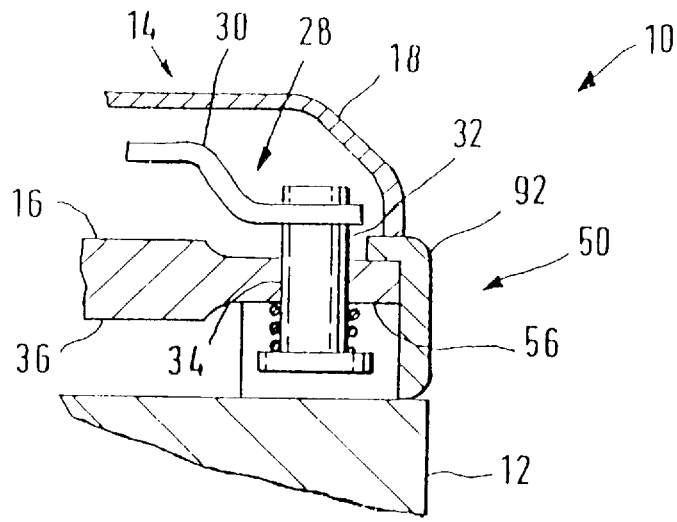
FIGS. 11 and 12 show a further alternative embodiment of the displacement contrivances, which comprises a shielding shoe made of fusible material.
Figure 12:
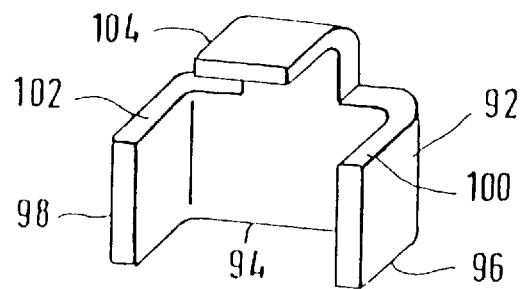

FIGS. 11 and 12 show another embodiment of a shielding shoe 92 which serves as the shielding elements 50. Again, the shielding shoe 92 is essentially fork-shaped and can be slid onto a radial projection 56 of the pressure plate 16. Similar to the embodiment of FIGS. 4 to 6, the radial projection 56 again has the through-opening 34 for the axial stop segment 32 of the clearance sensor 28. In this embodiment, the shielding shoe 92 is made of self-disintegrating, for example fusible material, such as wax or other similar material. Due to its deforming properties, the shielding shoe 92 is deformed in such a manner during the assembly of the pressure plate subassembly 14 and the flywheel 12 that it no longer interferes with the operation of the clearance sensor 28. The heat generated during the subsequent operation of the motor vehicle friction clutch 10 then melts the shielding shoe 92, and it can therefore flow out.

FIG. 12 shows that the shielding shoe 92 comprises a center wall segment 94 and two lateral wall segments 96, 98 which essentially extend at a right angle from the center wall segment 94. When attached to the radial projection 56 of the pressure plate 16, the frontal faces 100, 102 of these two wall segments 96, 98 make contact with the side of the radial projection 56 of the pressure plate 16 which faces the flywheel 12. Furthermore, a fastening segment 104, which reaches beyond the radial projection 56 of pressure plate 16, is provided on the center wall segment 94, and the shielding shoe 92 is held at the radial projection 56 by said fastening segment 104.

With respect to its melting characteristics, the shielding shoe 92 is designed in such a manner that it melts at temperatures in the range of about 30° Celsius to about 50° Celsius and above.

Figure 13:
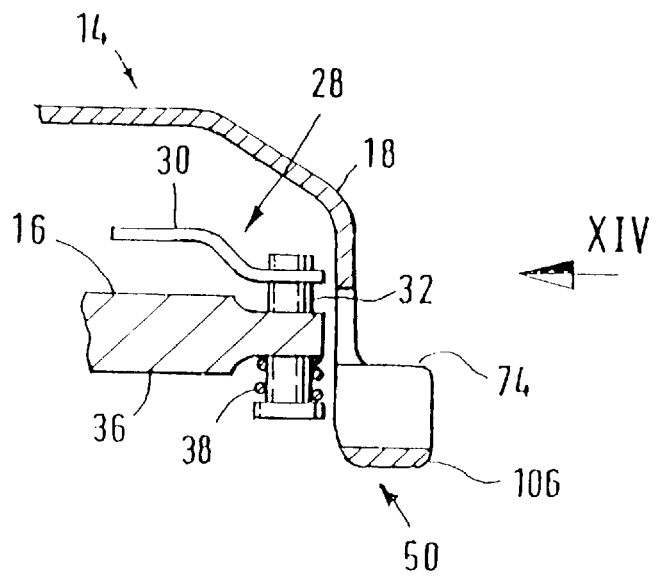
FIGS. 13 and 14 show a further alternative embodiment of the displacement contrivances which comprises a convexity at the radial periphery flange of the housing, whereby
Figure 14:
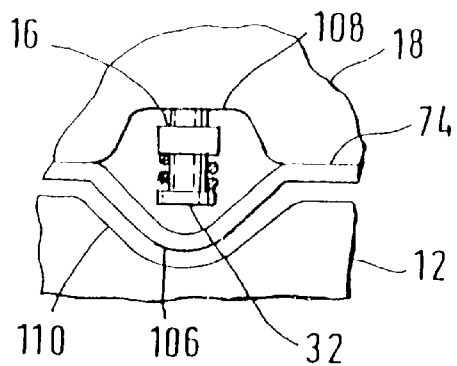

In the embodiment of FIGS. 13 and 14, the shielding elements 50 are formed by a convexity or convex portion 106 which is formed on the radial periphery flange 74 of the housing 18 and extends in the axial direction. FIG. 14 in particular shows that the housing 18 may be designed for this purpose with an opening 108 which creates a convexity 106 in the radial periphery flange 74 in the area of opening 108 after the housing 18 has been bent to form the radial periphery flange 74. A corresponding indentation 110 provided in the flywheel 12 can then accommodate the convexity 106 when the flywheel 12 is assembled with the pressure plate subassembly 14.

Figure 15:
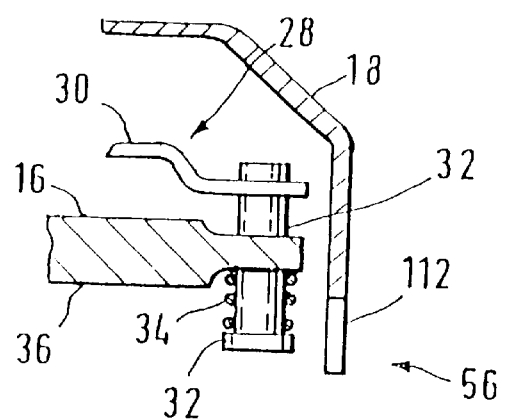
FIGS. 15 and 16 show a further alternative embodiment of the displacement contrivances which are formed by an axial projection at the housing, whereby FIG. 16 in particular represents the pressure plate subassembly which has been assembled with the flywheel.
Figure 16:
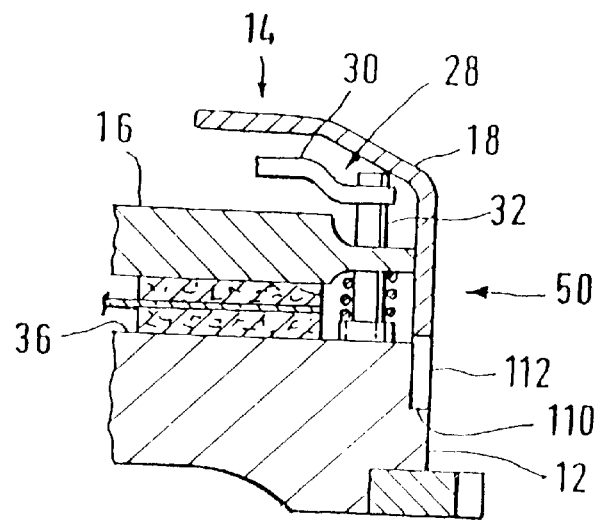

In the embodiment of FIGS. 15 and 16, a projection 112 extending in the axial direction is formed on the housing 18, which projection 112 again projects into an indentation 110 provided in the flywheel 12 when the pressure plate subassembly 14 and the flywheel 12 are in the assembled condition. Again, the projection 112 is designed in such a manner that it extends farther beyond the friction surface 36 of pressure plate 16 than the axial stop segment 32 of clearance sensor 28 before assembly with the flywheel 12.

Figure 17:
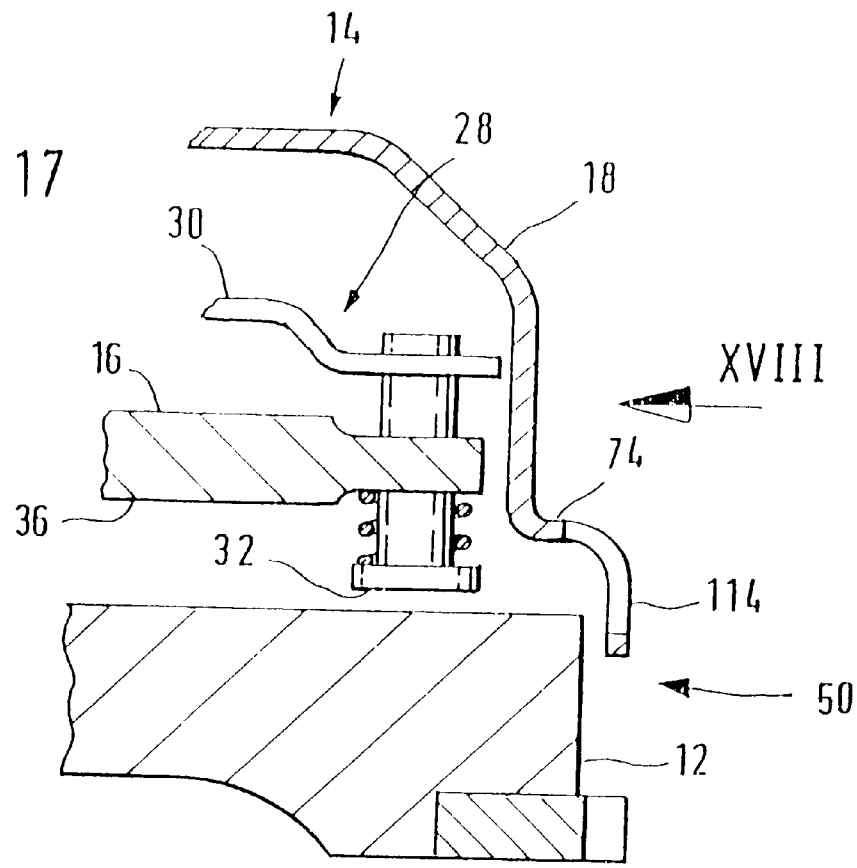
FIGS. 17 and 18 show a further alternative embodiment of the displacement contrivances, which are formed by an axial convexity provided at the radial periphery flange of the housing, whereby
Figure 18:
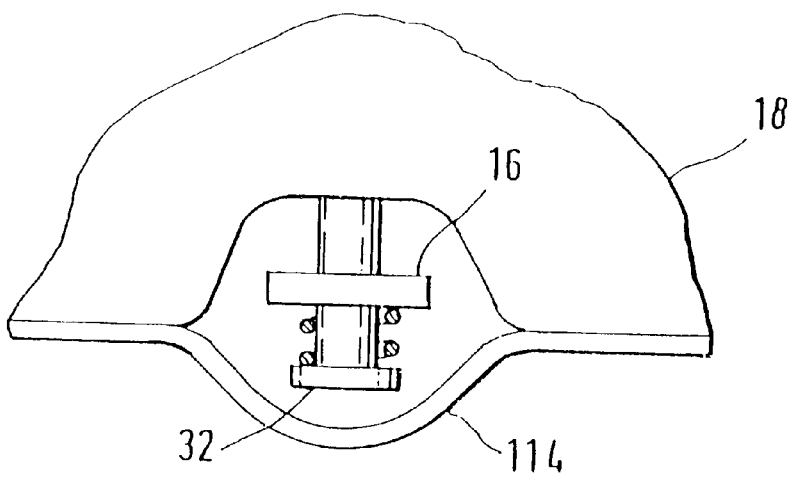

FIG. 17 and 18 show an embodiment where the shielding elements 50 are again formed by a convexity 114 which is formed at the radial periphery flange 74 and extends in the axial direction. However, in the embodiment of FIGS. 17 and 18, the axial convexity 114 does not project into a corresponding indentation in the flywheel 12, but is rather formed in such a manner that it reaches radially outward across the flywheel 12, i.e., it extends radially outward past the flywheel 12 in the axial direction when the pressure plate subassembly 14 and the flywheel 12 are in the assembled condition.

FIGS. 19 to 21 show another alternative embodiment of the shielding elements 50. Here, the construction of the pressure plate subassembly 14 again essentially conforms to the construction described with reference to FIG. 1. In this embodiment, the shielding elements 50 comprise a plurality of wedge elements or blocks 116, which are pivotally held at a center hub 118 by essentially U-shaped bars 120. When the shielding elements 50 are in shielding position (shown in FIG. 19), the wedges 116 are inserted between a radial inner area of the membrane spring element 20 and a complementary area of the housing 18 and move the membrane spring element 20 into a position which corresponds to a disengaged position of the clutch, i.e. the pressure plate 16 is moved away from the flywheel 12. FIG. 19 shows that in this position, the pressure plate 16 and the axial stop segment 32 of the clearance sensor 28 are completely retracted into the housing 18, so that the axial stop segment 32 is again protected against unintentional movement, for example when the pressure plate subassembly 14 is placed on the floor. Prior to assembly of the pressure plate subassembly 14 and the flywheel 12, the center hub 118 is turned in the direction of an arrow 122, as is shown in FIG. 21. During this rotational movement, the radial distance between the wedges 116 and the hub 118 is decreased, and the wedges 116 are moved from the shielding position shown in FIG. 19 into a position which is retracted with respect to the center hub 118, and the membrane spring 20 is thus released. The center hub 118 may also be used to center other components with respect to the housing 18, for example the clutch disc. The center hub 118 can also be omitted, in which case the wedge elements 116 must be removed.

FIG. 22 shows an embodiment of the shielding elements 50 where the shielding elements 50 are again formed by a screw 124 which fastens the housing 18 to the flywheel 12. In this way, the screw 124 penetrates a through-boring 126 in the radial periphery flange 74 of housing 18. The interior diameter of the through-boring 126 is dimensioned such that it is greater than an outer diameter of the screw 124. A clamping ring 130 is provided on the screw shaft 128, and said clamping ring 130 holds the screw 124 on housing 18 in an essentially completely inserted position. The screw 124 can be rotated freely to screw it into the complementary screw threads in the flywheel 12. Because the screw 124 and its screw shaft 128 again extend farther in the axial direction than the axial stop segment 32 of the clearance sensor 28, the screw 124 again prevents an unintentional placing of the pressure plate subassembly 14 directly on the axial stop segment 32.

FIG. 23 shows an embodiment of the shielding elements 50 which is similar to that in FIG. 22, whereby this embodiment provides an unthreaded segment 138 on screw 132 near a screw head 136. If the screw 132 is completely screwed into a threaded through-boring or opening 140 in the radial periphery flange 74 of the housing 18, its unthreaded segment 138 will be positioned with contact in the area of the through-opening 140. In this position, where the screw 132 is essentially completely screwed into the through-boring 140, the screw 132 will be supported by the housing 18, but can be rotated freely to be screwed into the corresponding thread borings in the flywheel 12. It is, of course, also possible to space a greater number of screws 132 designed in this manner on the radial periphery flange 74.

FIG. 24 and 25 each show two partial views of the pressure plate subassembly 14, whereby the shielding elements 50 are formed in these two figures by a pair of shielding tongues 142, 144 (FIG. 24) or a single shielding tongue 146 (FIG. 25) which are formed in the radial periphery flange 74. The shielding tongues 142, 144, or 146 are designed in such a manner that their first portion 150 is connected to the radial periphery flange 74, and that a second end portion 148 projects at an angle from the flange 74. The distances between the end of the tongues 142, 144 or 146, and the flange 74, in the axial direction, is such that they again project past the axial stop segment 32 in the axial direction and shield the axial stop segment 32 from exposure to force. Notches 152 (not shown in FIG. 25) can be provided in the area where the shielding tongues 142, 144, or 146 are connected to the radial periphery flange 74. These notches 152 can ensure that the shielding tongues 142, 144, and 146 can be bent back into a position that is in alignment with the radial periphery flange 74 when the pressure plate subassembly 14 and the flywheel 12 are assembled, to position the housing 18 in a suitable manner on the flywheel 12.

It is, of course, also possible to provide several, or several pairs, of such shielding tongues 144, 148 and 146 along the periphery of the housing 18.

FIG. 26 shows an embodiment of the shielding elements 50 wherein said shielding elements 50 comprise a tongue element 154. The tongue element 154 is again positioned with contact on the pressure plate 16 with the plate spring rivet 60, and its free end segment 156 extends so far beyond the friction surface 36 of pressure plate 16 that it rises above the axial stop segment 32 of the clearance sensor 28 in the axial direction. The element 154 can comprise a plate spring rivet 60 made of spring steel or other similar material. The spring characteristic of tongue element 154 is designed in such a manner that it can resist an exposure to force in the range of a multiple of the weight of the pressure plate subassembly 14, but that it yields to the force of pressure applied by the membrane spring element 20 and deforms, so that the operation or the function of the clearance sensor 28 is not impaired by the tongue element 154 or the plate spring rivet 60. Alternatively, the tongue element 154 can also be a bent piece of sheet metal.

FIG. 35, 36A and 36B show another alternative embodiment of the shielding elements 50 according to the present invention. In this embodiment, the shielding elements 50 comprise a solid, i.e. rigid, plate element 200 whose two opposite ends in the direction of the periphery are each solidly affixed to a pin element, shown in the represented embodiment as a grooved pin 202, 204, and thus forms a shielding plate element. An indentation 206, whose width and depth approximately correspond to the dimensions of plate element 200, is provided on housing 18, wherein said indentation 206 is provided staggered backward in the axial direction, i.e., away from the flywheel 12 with respect to a flywheel bearing surface 208 of the housing 18. Two through-openings 212, 214 are provided in a floor wall 210 of indentation 206, which are penetrated by the grooved pins 202, 204 and axially rotatably guided therein, but held by friction press-fit.

In this embodiment, the plate element 200 and thus the corresponding indentation 206 are arranged in the direction of the periphery in the area where a clearance sensor 28 of pressure plate subassembly 14 is also located. The function of this embodiment is described in the following with respect to the FIGS. 36A and 36B.

FIG. 36A shows a schematic arrangement of the pressure plate subassembly 14 prior to assembly to a flywheel 12. In this representation, the plate element 200 is in a shielding position. In this shielding position, the plate element 200 is arranged in such a manner that it projects over the flywheel bearing surface 208 of the housing 18 in the direction of axis A and is positioned essentially parallel to this surface 208.

In the shielding position, there is a slight gap between the axial stop segment 32 of the clearance sensor 28 and the plate element 200. The plate element 200 is affixed to the housing 18 with the grooved pins 202, 204 by means of a friction press-fit. In the application of normal force, i.e., when such a pressure plate subassembly 14 is placed on the plate elements 200, the friction press-fit of the grooved pins 202, 204 on the housing 18 is sufficient to prevent a displacement of the plate element 200 from its shielding position. The small gap between the axial stop segment 32 and the plate element 200 provides an additional safety measure, to prevent an impact on the clearance sensor 28 during brief, extreme exposure to force as, for example, the impact after dropping such a pressure plate subassembly 14, which may lead to a slight displacement of the plate elements 200. The friction press-fit of the grooved pins 202, 204 at the housing 18 is dimensioned in such a manner that it is in the range of about 200 N to about 400 N.

In the shielding position shown in FIG. 36A, which is a position where the pressure plate subassembly 14 has been prepared for assembly to a flywheel 12, the clearance sensor 28 is already in an assembly preparation position where it extends at least far enough in axial direction over the flywheel bearing surface 208 of the housing 18 so that it is instantly ready to detect wear after the assembly with the flywheel 12. It is preferable, however, that the axial stop segment 32 of the clearance sensor 28 projects slightly farther above the flywheel bearing surface 208 than is required for its functioning to detect wear at the onset of operation of a clutch constructed in this manner.

FIG. 36B schematically shows a housing 18 connected to a flywheel 12. In this position, the flywheel bearing surface 208 of the housing 18 makes contact with the flywheel 12. When the flywheel 12 is connected to the housing 18, for example by screws which are not shown here, a sufficient force can be developed between these two components in the axial direction such that the grooved pins 202, 204 are displaced against their friction force in an axial direction if the flywheel 12 makes contact with a side 216 of the plate element 200 which faces the flywheel 12. When the housing 18 and the flywheel 12 subsequently move closer to each other, the plate element 200 is inserted into the indentation 206 in the axial direction toward the housing 18 until it is completely located in the indentation 206. It may be provided that the depth of the indentation 206 corresponds to the thickness of the plate element 200 in the axial direction. In this position, the plate element 200 is then held, preferably clamped, between the housing 18, i.e. the floor 210 of the indentation 206, and the flywheel 12.

In this function release position, the axial stop segment 32 of the clearance sensor 28 makes contact with the side 218 of the plate element 200 which faces away from the flywheel 12.

It has already been previously mentioned that the positioning of the axial stop segment 32 of the clearance sensor 28 prior to the assembly of the pressure plate subassembly 14 to the flywheel 12 may be such that the axial stop segment 32 projects farther over the flywheel bearing surface 208 than is required for its initial position. When the pressure plate subassembly 14 and the flywheel 12 are assembled, the axial stop segment 32 will then make contact on the side 218 of the plate element 200, and it may be pushed back in the axial direction until the flywheel 12 makes contact with the flywheel bearing surface 208 of the housing 18. The clearance sensor 28 is then ready to detect wear in the known manner. In this embodiment, the clearance sensor 28 particularly does not detect the play immediately by scanning the surface of a flywheel 12, but by scanning the side 218 of the plate element 200, whose other side 216 makes contact with the flywheel 12.

Because this type of embodiment does not require the removal of the shielding elements 50 from the pressure plate subassembly 14, when the pressure plate subassembly 14 is assembled to the flywheel 12, the assembly is simplified when clutches consisting of such pressure plate subassemblies 14 are being assembled. Here, it is not possible to forget the removal of the shielding elements 50 when the housing 18 is connected to the flywheel 12 because they are automatically moved from the shielding position (FIG. 36A) to the function release position (FIG. 36B), where the clearance sensor 28 can then detect the wear.

FIGS. 37 and 38 show several embodiment options for the plate element 200. In FIG. 37, for example, the plate element 200 is connected with separate pins 202, 204, for example by pressing in, soldering, or the like. The pins 202, 204 are designed as grooved pins in an especially simple and cost-efficient manner. The plate element 200 is preferably made of inexpensive material; it can be made from cast metal, or it can be cut out or punched out from a piece of sheet metal.

In the representation of FIG. 38, the plate element 200' includes a piece cut out or punched out from sheet metal, which piece is integrally designed with the pins 202' and 204'. The pins 202', 204' can be bent in such a manner that their function corresponds to that of the pins 202, 204 described with reference to FIG. 37. The pins 202', 204' can again be inserted or pressed into corresponding openings in the housing 18 s0 that they are held on the housing 18 by a friction press-fit, but can be displaced by a predetermined force which, for example, can be in the range of about 200 N to about 400 N.

FIG. 38 also shows that the center area of the plate element 200' has a through-opening 220' for the axial stop segment 32 of the clearance sensor 28. When the pressure plate subassembly 14 is in assembled condition, this opening 220' is axially aligned with the axial stop segment 32, so that the axial stop segment 32 can make direct contact with the flywheel 12 through the opening 220' and detect the wear with respect to the flywheel 12. It is, of course, possible that such an opening 220' can also be provided for the plate element 200 in FIG. 37.

FIG. 39 shows another embodiment of the pressure plate subassembly 14 according to the invention. This embodiment essentially conforms to the embodiment represented in FIG. 35. The housing 18 again has an indentation 206 which receives a shielding plate element. In the embodiment in FIG. 39, the shielding plate element is formed by the spring plate element 222. The spring plate element 222 is inserted into the housing 18, where it is positioned with contact in the direction of the periphery on both sides of the clearance sensor 28 in channel-shaped recesses 226, 228 of the side walls 230, 232 of the indentation 206. FIG. 39 shows that a spring plate element 222 essentially arches around the axial stop segment 32 of the clearance sensor 28, whereby the spring plate element 222 has its axial apex and runs nearly parallel to the flywheel bearing surface 208 of housing 18 in the area where it directly shields the axial stop segment 32, i.e., where it is essentially axially aligned with the same.

In FIG. 39, the solid lines show the shielding position of the spring plate element 222, in which position said spring plate element 222 projects past the flywheel bearing surface 208 in the axial direction and thus prevents any force from acting on the axial stop segment 32, i.e., it shields said axial stop segment 32. When the pressure plate subassembly 14 is connected to a flywheel 12, the spring plate element 222 first makes contact with the flywheel 12, and when the housing 18 and the flywheel 12 get closer, the spring plate element 222 is displaced in the axial direction from the shielding position into a function release position, in which the spring plate element 222 is essentially completely accommodated in the indentation 206. In this way, said spring plate element 222 may assume an essentially M-shaped configuration. The configuration of the spring plate element 222 is shown in FIG. 39 as a dotted line of the front edge of the spring plate element 222. It is also possible, however, that the spring plate element 222 assumes some other type of deformed configuration in this function release position, in which configuration it can be completely accommodated by the indentation 206. Thus, in one possible configuration, the recesses 226, 228 are arranged farther staggered in the direction of the flywheel bearing surface 208, so that they have an axial distance to the bottom of the indentation 206. In this configuration, the spring plate element 222 may snap from the shielding position shown in FIG. 39 to a function release position when the housing 18 is connected to the flywheel 12, and the spring plate element 222, when in said function release position, can be bent into the opposite direction than that shown in FIG. 39, i.e., into the indentation 206 and away from the flywheel 12. This however, as previously mentioned, requires an axial construction space between the positioning points of the spring plate element 222 and the floor of the indentation 206, which space can accommodate the spring plate element 222, which is then bent in the opposite direction.

For the axial stop segment 32 to detect the wear with respect to the flywheel 12, the spring plate element 222 has a through-opening 224 that is in axial alignment with the axial stop segment 32, which through-opening is penetrated by the axial stop segment 32 after the deformation of the spring plate element 222 from the shielding position into the function release position, so that said axial stop segment 32 can directly detect the wear with respect to the flywheel 12.

To provide a reliable shielding of the clearance sensor 28, the spring plate element 222 is configured in such a manner that it can be deformed from its shielding position into the function release position by a force in a range between about 200 N to about 400 N. Such a deformation force is sufficient to prevent a deformation of the spring plate element 222 when such a pressure plate subassembly 14 is placed on it, but it applies a sufficient axial force to the spring plate element 222, for example by studs or such (not shown), that it deforms when the housing 18 is connected to the flywheel 12.

In the embodiment of FIG. 39, the spring plate element 222 also remains on a clutch constructed in this manner after the pressure plate subassembly 14 is connected to a flywheel 12. Thus, a removal of these shielding elements 50 is not necessary, which simplifies the assembly of a clutch of this type, and leaving the shielding elements 50 unintentionally on the clutch will not interfere with its functioning.

Although the previous references to the embodiments in FIGS. 35 to 39 only describe and show one such clearance sensor with a corresponding shielding plate, it is, of course, possible that several clearance sensors and the corresponding shielding plates may be provided along the periphery of such a pressure plate subassembly.

FIGS. 1 to 26 and 35 to 39 describe embodiments of displacement contrivances which are constructed as shielding elements, i.e., the displacement contrivances shown there shield the axial stop segment of the clearance sensor from exposure to force. In particular, the shielding elements extend beyond the axial stop segment in the axial direction, to shield said axial stop segment from exposure to force. The references to FIGS. 27 to 34 now describe embodiments of displacement contrivances where an application of force on the axial stop segment is basically possible, but where the displacement contrivances comprise means to prevent a movement of the clearance sensor, i.e., the axial stop segment.

In FIG. 27, the displacement contrivances comprise blocking elements 160. The blocking elements 160 comprise a pin or stud 162, which is arranged on the housing 18 in the area of the clearance sensor 28 and is clamped in a through-opening 164 provided in the housing 18. The pin 162 engages directly on the clearance sensor 28, for example at the operation lever segment 30, and prevents a displacement of the axial stop segment 32 with respect to the housing 18 and thus the pressure plate 16 in this condition of the pressure plate subassembly 14. The clamping force of the pin 162 in the through-opening 164 is designed in such a manner that it again weighs a multiple of the weight which may be applied to the axial stop segment 32 by the pressure plate subassembly 14. When the pressure plate subassembly 14 is connected to the flywheel 12, and when the axial stop segment 32 is positioned at the flywheel 12, the clamping force of the pin 162 in the through-opening 164 is overcome, especially during disengagement of the clutch, so that the pin 162 is displaced in the through-opening 164 and can subsequently no longer interfere with the operation of the clearance sensor 28. It may also be provided that the pin 162 deforms in such a manner that it can no longer interfere with the operation of the clearance sensor 28.

In the embodiment of FIG. 28, the blocking elements 160 comprise a radially projecting blocking projection 166 on the membrane spring 20. The blocking projection 166 is bent toward the clearance sensor 28 in its radial outer periphery and connects the clearance sensor 28 to the pressure plate subassembly 14 in the position of the pressure plate subassembly 14 shown in FIG. 28 against axial displacement.

During the assembly of the pressure plate subassembly 14 to the flywheel 12, and the device which acts together with the membrane spring 20 to operate the clutch, i.e., to disengage the clutch, the inner radial area of the membrane spring 20 is moved toward the pressure plate 16 so that its radial outer area with the blocking projection 166 moves away from the clearance sensor 28 and releases it. Especially during the subsequent disengagement of the clutch, for example when the clutch is mounted in a vehicle, the radial inner area of the membrane spring 20 is moved more toward the pressure plate 16 so that the radial outer area of said pressure plate 16, particularly the blocking projection 166, is pivoted farther away from the clearance sensor 28 and thus any reciprocal interference between the radial outer area of the membrane spring 20 and the clearance sensor 28 is excluded.

FIG. 28A shows that it is also possible to design the blocking projection 200 as a separate component and plug it onto the membrane spring 20. It can then be optionally left in the clutch or removed after the assembly.

Figure 32:
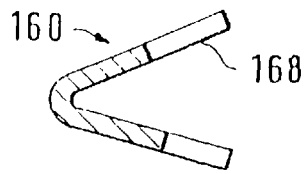
Figure 33:
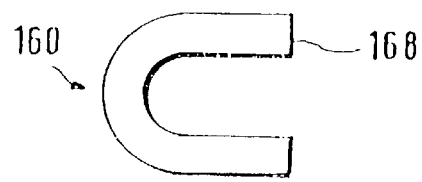

FIGS. 29 to 33 show an embodiment of the blocking elements 160 where said blocking elements 160 are formed by a blocking shoe 168. The blocking shoe 168 has an essentially fork-shaped profile and can be inserted between the friction surface 36 of the pressure plate 16 in the area of the through-opening 34 for the axial stop segment 32 and a radially projecting projection 170 in the area of a free end 172 of the axial stop segment 32. Prior to the assembly of the pressure plate subassembly 14 and the flywheel 12, the blocking shoe 168 can be laterally removed with a handle element 169. The blocking shoe 168 may be produced as a piece of sheet metal bent into fork-shape. Alternatively, it is possible to make the blocking shoe 168 of synthetic material or similar material. As shown in FIGS. 32 and 33, the area of the blocking shoe 168 which can be inserted between the projection 170 and the friction surface 36 may be designed V-shaped or U-shaped, and it can especially be designed as a plate spring element bent into V-shape. The blocking shoe may also be of a self-disintegrating, for example fusible, material.

FIG. 34 shows an embodiment of the blocking elements 160 where said blocking elements are formed by a ring element 174 which is arranged in an enlarged area 176 of the through-opening 34 in the pressure plate 16. The ring element 174 is arranged on the side of the through-opening 34 which is open toward the friction surface 36 of the pressure plate 16. The ring element 174 holds the axial stop segment 32 in the through-opening 34 by friction action or sticking action. When a pressure plate subassembly 14 designed in this manner is operated in a motor vehicle friction clutch, the heat generated during operation will melt the ring element 174, which consists of a fusible material, so that it flows out through the through-opening 34. The ring element 174 is made of a material which melts at temperatures in the range of 30° Celsius and 50° Celsius and above.

In the embodiment shown in FIG. 34, the clearance sensor 28 is pre-stressed in its friction press-fit by a plate spring element 178 which is affixed to the end portion of the operation lever segment 30. In doing so, the plate spring element 178 is supported in a radial inner area by the pressure plate 16.

Although the preceding figures show individual embodiments of the displacement contrivances, it is, of course, also possible that several types of such displacement contrivances can be combined in a pressure plate subassembly. To increase safety, it is possible on the one hand to provide displacement contrivances which serve as shielding elements and are supposed to prevent the application of a displacement force on the clearance sensor, and on the other hand, to provide displacement contrivances which act as blocking elements and block the displacement of the clearance sensor when a displacement force is nevertheless applied to the clearance sensor.

It is furthermore possible, of course, that the previously described displacement contrivances can be used in a number of clutch constructions, for example with a pot-style flywheel which radially projects beyond the pressure plate on the outside, and where the axial stop segment does not project past the friction surface of the pressure plate, so that the description with reference to a certain constructive embodiment of the pressure plate subassembly should only be seen as exemplary and not as limiting.

One feature of the invention resides broadly in the pressure plate subassembly 14 for a motor vehicle friction clutch 10, comprising a pressure plate 16 which is connected to a flywheel 12 to jointly rotate around an axis A and can be axially displaced with respect to the flywheel 12 when the motor vehicle clutch is in assembled condition, whereby the pressure plate 16 has a friction surface 36 which faces the flywheel 12, and whereby at least one clearance sensor 28 is provided at the pressure plate 16, with a operation lever segment 30 that cooperates with a wear adjustment device 22 and an axial stop segment 32 which cooperates with the flywheel 12, whereby the clearance sensor 28, of which there is at least one, can be displaced in axial direction with respect to the pressure plate 16 and is affixed to the pressure plate 16 in axial direction, preferably by a pre-stressed spring, also comprising displacement contrivances 50; 160 which prevent a displacement of the clearance sensors, of which there is at least one, with respect to the pressure plate 16 prior to assembly of the pressure plate subassembly 14 to the flywheel 12.

Another feature of the invention resides broadly in the pressure plate subassembly characterized in that the displacement contrivances 50 prevent a displacement force action on the axial stop segment 32.

Yet another feature of the invention resides broadly in the pressure plate subassembly characterized in that the displacement contrivances 50 comprise shielding elements 50.

Still another feature of the invention resides broadly in the pressure plate subassembly characterized in that the shielding means 50 are arranged on the pressure plate 16.

A further feature of the invention resides broadly in the pressure plate subassembly characterized in that the shielding means 50 at least partially enclose the axial stop segment 32 in direction of the periphery.

Another feature of the invention resides broadly in the pressure plate subassembly characterized in that the shielding means 50 comprise a shielding sleeve 44.

Yet another feature of the invention resides broadly in the pressure plate subassembly characterized in that the shielding sleeve 44 partially projects into an opening 34 which is provided in the pressure plate 16 and penetrated by the axial stop segment 32, where said shielding sleeve is affixed to the pressure plate 16.

Still another feature of the invention resides broadly in the pressure plate subassembly characterized in that the shielding sleeve 44 can be plastically or elastically deformed by the application of a prescribed force.

A further feature of the invention resides broadly in the pressure plate subassembly characterized in that the shielding elements 50 comprise at least one shielding shoe 54; 92 which can be affixed to the pressure plate 16 preferably by plug-in effect, and that said shielding shoe, when affixed to the pressure plate 16, at least partially encloses the axial stop segment 32.

Another feature of the invention resides broadly in the pressure plate subassembly characterized in that the shielding shoe 92, of which there is at least one, is made of a self-disintegrating material, preferably of wax.

Yet another feature of the invention resides broadly in the pressure plate subassembly characterized in that the self-disintegrating material melts at operating temperatures, preferably at approximately 30° Celsius and higher.

Still another feature of the invention resides broadly in the pressure plate subassembly characterized in that the shielding means 50 comprise at least one pin element 64; 86 which is affixed to the pressure plate subassembly 14 by friction press-fit and can be axially displaced by applying a predetermined force.

A further feature of the invention resides broadly in the pressure plate subassembly characterized in that the pin element 64, of which there is at least one, is affixed to the pressure plate 16 in the vicinity of the axial stop segment 32.

Another feature of the invention resides broadly in the pressure plate subassembly characterized in that the pin element 64, of which there is at least one, is affixed to the pressure plate 16 in a plate spring rivet 60.

Yet another feature of the invention resides broadly in the pressure plate subassembly characterized in that the pressure plate subassembly also contains a housing 18 which is non-rotationally connected to the pressure plate 16 and can be axially displaced with respect to the pressure plate 16; in assembled condition of the motor vehicle friction clutch 10, said housing can be solidly connected to the flywheel 12 in a radial outer area, whereby the shielding elements 50 are provided at the housing 18.

Still another feature of the invention resides broadly in the pressure plate subassembly characterized in that the pin 86, of which there is at least one, is arranged on the housing.

A further feature of the invention resides broadly in the pressure plate subassembly characterized in that the housing 18 comprises a radial periphery flange 74 at the radial outer housing margin to affix the housing 18 to the flywheel 12.

Another feature of the invention resides broadly in the pressure plate subassembly characterized in that the radial periphery flange 74 is partially deformed in axial direction to provide a shielding element 50.

Yet another feature of the invention resides broadly in the pressure plate subassembly characterized in that at least one axial convexity 106; 114 is provided in the radial periphery flange 74.

Still another feature of the invention resides broadly in the pressure plate subassembly characterized in that at least one shielding tongue 142, 144; 146 is provided in the radial periphery flange 74; said shielding tongue extends in the direction of the periphery and is connected to the radial periphery flange 74 in an end portion 15, while its second end portion 148 projects in axial direction.

A further feature of the invention resides broadly in the pressure plate subassembly characterized in that at least one projection 112 is provided on a radial outer segment of the housing 18, where said projection extends in axial direction and forms the shielding elements 50.

Another feature of the invention resides broadly in the pressure plate subassembly characterized in that at least one recess 110 is provided in the flywheel 12, where said recess accommodates the shielding elements 106; 112.

Yet another feature of the invention resides broadly in the pressure plate subassembly characterized in that the shielding elements 114 reach radially outward across the flywheel 12.

Still another feature of the invention resides broadly in the pressure plate subassembly characterized in that a number of holes 76; 126; 140 are provided in the radial periphery flange 74, said holes are penetrated by studs 78; 124; 132; to affix the housing 18 to the flywheel 12, and that the studs 78; 124; 132 form the shielding elements 50, whereby the studs 78; 124; 132 are essentially completely inserted into the holes 76; 126; 140 and means 80; 130; 138 are provided to hold the studs 78; 124; 132 in the completely inserted position.

A further feature of the invention resides broadly in the pressure plate subassembly characterized in that the pressure plate subassembly also comprises an energy storing device, especially a membrane spring 20, whereby the pressure plate 16 is pushed by the energy storing device 20 in the direction of an open side of the housing which is provided for the connection to the flywheel 12, also comprising means of pre-stressing 116, 118, 120 to hold the pressure plate 16 against the action of the energy storing device 20 when it is in a position completely retracted into the housing 18.

Another feature of the invention resides broadly in the pressure plate subassembly characterized in that the pressure plate subassembly 14 also comprises a clutch disc 68 which, possibly with interposition of friction linings 70, rests on the friction surface 36 of the pressure plate 16, and that removable means of fastening 72 are provided as well, to affix the clutch disc 68 with respect to the pressure plate 16, whereby the clutch disc 68 and possibly the friction linings 70, in cooperation with the means of fastening 72, form the shielding elements 50.

Yet another feature of the invention resides broadly in the pressure plate subassembly characterized in that the shielding elements 50 comprise a shielding plate 200; 200; 222 which is arranged at the housing and is in a shielding position if the housing 18 is separated from the flywheel 12; in said shielding position, said shielding plate is arranged in such a manner that it projects past a flywheel bearing surface 208 of the housing 18 in axial direction to shield the axial stop segment 32 of the clearance sensor 28, of which there is at least one, and when the housing 18 is connected to the flywheel 12, said shielding plate can be rotated by an essentially axially directed force into a function release position, where the axial stop segment 32 can detect any wear.

Still another feature of the invention resides broadly in the pressure plate subassembly characterized in that the shielding plate 200; 200 comprises an essentially rigid plate 200; 200 which is affixed to the housing 18, preferably in the direction of the periphery on both sides of the clearance sensor 28, of which there is at least one, and can be axially displaced.

A further feature of the invention resides broadly in the pressure plate subassembly characterized in that at least one axially extending pin element 202, 204; 202, 204 is arranged on each peripheral end margin of the plate element 200; 200, said pin element can be axially displaced and is held on the housing 18 in a corresponding pin recess opening 212, 214 by friction press-fit.

Another feature of the invention resides broadly in the pressure plate subassembly characterized in that the pin element 202, 204; 202, 204, of which there is at least one, comprises a grooved pin or similar device on each peripheral end.

Yet another feature of the invention resides broadly in the pressure plate subassembly characterized in that in the segment provided on the housing to affix the shielding plate element 200 for the at least one clearance sensor 28, a recessed indentation 206 is arranged with respect to the flywheel bearing surface 208, and said indentation can essentially completely accommodate the shielding plate element 200 when the housing 18 is connected to the flywheel 12.

Still another feature of the invention resides broadly in the pressure plate subassembly characterized in that the side 216 of the shielding plate element 200; 200; 222 which faces the flywheel 12 is at least partially positioned with contact on the flywheel 12 when said flywheel is connected to the housing.

A further feature of the invention resides broadly in the pressure plate subassembly characterized in that the axial stop segment 32 to detect the wear can be attached on the side 218 of the shielding plate element 200 which faces away from the flywheel 12.

Another feature of the invention resides broadly in the pressure plate subassembly characterized in that the shielding plate element 200 has an axial through opening 220 which is essentially aligned with the axial stop segment 32 in axial direction, and that the axial stop segment 32 to detect wear can be positioned with contact on the flywheel 12.

Yet another feature of the invention resides broadly in the pressure plate subassembly characterized in that the shielding plate element 222 comprises a preferably spring-elastically deformable spring plate element 222 which is attached to the housing 18, preferably on both sides, in direction of the periphery with respect to the clearance sensor 28, of which there is at least one, and can be deformed from the shielding position into the function release position when the housing 18 is connected to the flywheel 12.

Still another feature of the invention resides broadly in the pressure plate subassembly characterized in that in the segment on the housing 18 which is provided to attach the spring plate element 222 for the clearance sensor 28, of which there is at least one, an indentation 206 which is recessed with respect to the flywheel bearing surface 208 is arranged, and that said indentation can essentially completely accommodate the spring plate element 222 when the housing 18 is connected to the flywheel 12.

A further feature of the invention resides broadly in the pressure plate subassembly characterized in that the spring plate element 222 essentially arches around the axial stop segment 32 in the shielding position, and essentially assumes the configuration of an M-spring, or a spring plate that is bent like an arch in the opposite direction, after deformation into the function release position.

Another feature of the invention resides broadly in the pressure plate subassembly characterized in that the spring plate element 222 has an axial through-opening 224 which is essentially aligned with the axial stop segment 32 in axial direction, and that the axial stop segment 32 can be positioned with contact on the flywheel 12 to detect the wear.

Yet another feature of the invention resides broadly in the pressure plate subassembly characterized in that the portion of the shielding plate element 200; 200; 222 which shields the axial stop segment 32 is arranged approximately parallel to the flywheel bearing surface 208 of the housing 18 when said shielding plate element is in shielding position.

Still another feature of the invention resides broadly in the pressure plate subassembly characterized in that the axial force is in the range of 100 N to 500 N, preferably 200 N to 400 N.

A further feature of the invention resides broadly in the pressure plate subassembly characterized in that the displacement contrivance comprises blocking elements 160 which block the displacement of the clearance sensor 28 in case of an external displacement force effect on the clearance sensor 28.

Another feature of the invention resides broadly in the pressure plate subassembly characterized in that the blocking elements 16 comprise a blocking shoe 168 which can be inserted between the pressure plate on the side of the friction surface 36 and a projection 170 formed at the free end 172 of the axial stop segment 32.

Another feature of the invention resides broadly in the pressure plate subassembly characterized in that the blocking elements 16 comprise a blocking shoe 168 which can be inserted between the flywheel on the side of the friction surface 36 and a projection 170 formed at the free end 172 of the axial stop segment 32.

Yet another feature of the invention resides broadly in the pressure plate subassembly characterized in that the blocking elements 160 are comprised of a self-disintegrating ring element 174 which is arranged in an area of a through-opening 34 in the pressure plate 16 which is penetrated by the axial stop segment 32, whereby the self-disintegrating ring element 174 blocks the axial stop segment 32 by friction—and/or sticking action and/or positive locking from axial displacement.

Still another feature of the invention resides broadly in the pressure plate subassembly characterized in that the ring element 174 melts at temperatures generated at the start of operation, preferably at approximately 30° Celsius and above.

A further feature of the invention resides broadly in the pressure plate subassembly characterized in that the pressure plate subassembly 14 also comprises a housing 18 which is non-rotationally connected to the pressure plate 16 and can be axially displaced with respect to the pressure plate 16.

Another feature of the invention resides broadly in the pressure plate subassembly characterized in that the blocking elements 160 comprise a blocking pin 162 which is held in the housing 18 and axially fastens the clearance sensor 28 with respect to the housing 18.

Yet another feature of the invention resides broadly in the pressure plate subassembly characterized in that the blocking pin 162 is attached in the housing 18 by clamping action and can be displaced in axial direction with respect to the housing to release the clearance sensor 28 when a predetermined force is applied.

Still another feature of the invention resides broadly in the pressure plate subassembly characterized in that the pressure plate subassembly 14 also comprises an energy storage device, especially a membrane spring 20, which pre-stresses the pressure plate 16 with respect to the housing 18, whereby the energy storing device 20 has at least one blocking projection 166 which projects radially outward and acts on the clearance sensor 28 when the motor vehicle friction clutch 10 is in unassembled condition to shield said clearance sensor against axial displacement.

A further feature of the invention resides broadly in the pressure plate subassembly characterized in that the blocking projection 166 engages on the clearance sensor 28 in the area where the operation lever segment 30 connects to the axial stop segment 32.

Another feature of the invention resides broadly in the pressure plate subassembly characterized in that the blocking projection 200 can be attached, preferably plugged into the energy storing device 20 and, if required, can either be removed from the energy storing device 20 or remain on said energy storing device after the motor vehicle friction clutch has been assembled.

Yet another feature of the invention resides broadly in the displacement contrivance 50; 160 for a pressure plate subassembly 14 to prevent the displacement of a clearance sensor 28 that is arranged on a pressure plate 16 prior to assembly of the pressure plate subassembly 14 to a flywheel 12, whereby the displacement contrivances 50; 160 comprise elements 50 to prevent a displacement force action on the clearance sensor 28 and/or means 160 to block the clearance sensor 28 against displacement when a displacement force acts on the clearance sensor 28, if desired with one or several of the features of the above features.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign and international patent publication applications, namely, Federal Republic of Germany Patent Application No. 196 38 918.6 filed on Sep. 23, 1996, and Inner Priority 196 15 255.0 filed on Apr. 18, 1996, having inventors Michael Weiss, Reinhold Weidinger, Achim-Link, Andreas Orlamünder, and Uwe Sahlmüller, and DE-OS 196 38 918.6 filed on Sep. 23, 1996, and Inner Priority 196 15 255.0 filed on Apr. 18, 1996 and DE-PS 196 38 918.6 filed on Sep. 23, 1996, and Inner Priority 196 15 255.0 filed on Apr. 18, 1996, are hereby incorporated by reference as if set forth in their entirety herein. in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A pressure plate shipping assembly for a motor vehicle friction clutch, the shipping assembly for being used prior to installation of the shipping assembly in a motor vehicle to reduce damage to a pressure plate clearance sensor during shipping, said shipping assembly comprising:

a pressure plate assembly to be connected to a flywheel;

said pressure plate assembly comprising structure to connect said pressure plate assembly to a flywheel;

said pressure plate assembly comprises a pressure plate;

said pressure plate has an axis of rotation and defines an axial direction parallel to said axis of rotation;

said pressure plate comprises a hole disposed therethrough;

a clutch housing disposed about said pressure plate assembly;

at least one clearance sensor disposed adjacent said pressure plate assembly;

said at least one clearance sensor comprising:
  an operation lever;
  said operation lever being disposed adjacent to said clutch housing;
  an axial stop segment;
  said axial stop being connected to said operation lever;
  said axial stop segment being disposed through said hole in said pressure plate;

at least one shipment protective structure being configured and disposed to minimize damage to said at least one clearance sensor during shipment;

said shipment protective structure comprising:

a projection;
said projection being disposed on said clutch housing;
said projection being disposed to extend in the axial direction beyond said axial stop segment; and
said projection comprising one of a), b) and c):
   a) a convex portion disposed about said axial stop segment;
   b) a convex portion disposed about said axial stop segment, said convex portion being configured to mesh with an indented portion in a flywheel; and
   c) an axial extension, said axial extension being disposed to extend past said axial stop segment towards a flywheel, said axial extension being configured to be received by a notch in a flywheel.

2. A pressure plate shipping assembly for a motor vehicle friction clutch, the shipping assembly for being used prior to installation of the shipping assembly in a motor vehicle to reduce damage to a pressure plate clearance sensor during shipping, said shipping assembly comprising:

a pressure plate assembly to be connected to a flywheel;
said pressure plate assembly comprising structure to connect said pressure plate assembly to a flywheel;
a clutch housing disposed about said pressure plate assembly;
at least one clearance sensor disposed adjacent said pressure plate assembly;
at least one shipment protective structure being configured and disposed to minimize damage to said at least one clearance sensor during shipment;
said pressure plate assembly further comprising:
   a pressure plate;
   said pressure plate having a first side and a second side;
   at least one membrane spring;
   said at least one membrane spring being disposed adjacent said second side of said pressure plate; and
   at least one biasing spring to bias said pressure plate assembly with respect to a flywheel;
said pressure plate having an axis of rotation and defining an axial direction parallel to said axis of rotation;
said at least one clearance sensor being disposed to be displaceable with respect to said pressure plate;
said pressure plate comprising a hole disposed therethrough;
said at least one clearance sensor comprising:
   an operation lever;
   said operation lever being disposed adjacent to said clutch housing;
   said operation lever being operatively connected to said at least one membrane spring;
   an axial stop segment;
   said axial stop being connected to said operation lever;
   said axial stop segment being disposed through said hole in said pressure plate; and
   said axial stop segment extending a first axial distance from said first side of said pressure plate toward a flywheel;
said at least one shipment protective structure comprising a protective structure to prevent an axial force from being applied to said axial stop segment before connecting said pressure plate shipping assembly to a motor vehicle friction clutch;
said protective structure comprising:
   a projection;
   said projection being disposed on said clutch housing;
   said projection being disposed to extend in the axial direction beyond said axial stop segment; and
   said projection comprising one of a), b) and c):
      a) a convex portion disposed about said axial stop segment;
      b) a convex portion disposed about said axial stop segment, said convex portion being configured to mesh with an indented portion in a flywheel; and
      c) an axial extension, said axial extension being disposed to extend past said axial stop segment towards a flywheel, said axial extension being configured to be received by a notch in a flywheel.

* * * * *

UNITED STATES PATENT AND TRADEMARK OFFICE
CERTIFICATE OF CORRECTION

PATENT NO. : 5,941,356

DATED : August 24, 1999

INVENTOR(S) : Michael WEISS, Reinhold WEIDINGER, Achim LINK, Andreas ORLAMÜNDER, and Uwe SAHMÜLLER It is certified that error appears in the above-identified patent and that said Letters Patent is hereby corrected as shown below:

In column 7, line 30, after 'plate' delete "a4".

In column 10, line 32, after 'in' insert "an".

In column 11, line 2, after 'housing', delete "1B" and insert --18--.

In column 17, line 30, after the first occurrence of '18', delete "s0" and insert --so--.

Signed and Sealed this

Fifth Day of December, 2000

Attest:

Attesting Officer

Q. TODD DICKINSON

Director of Patents and Trademarks